(12) United States Patent
Knadle, Jr. et al.

(10) Patent No.: US 8,514,079 B2
(45) Date of Patent: Aug. 20, 2013

(54) FREQUENCY SELECTIVE SURFACE AIDS TO THE OPERATION OF RFID PRODUCTS

(75) Inventors: Richard T. Knadle, Jr., Dix Hills, NY (US); Mark Duron, East Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 626 days.

(21) Appl. No.: 12/822,678

(22) Filed: Jun. 24, 2010

(65) Prior Publication Data

US 2010/0259365 A1 Oct. 14, 2010

Related U.S. Application Data

(62) Division of application No. 11/641,782, filed on Dec. 20, 2006, now Pat. No. 7,884,718.

(51) Int. Cl.
*G08B 13/14* (2006.01)
(52) U.S. Cl.
USPC .......... 340/572.1; 340/572.4; 340/572.7; 340/572.8; 340/10.1; 340/10.2; 340/5.6; 343/878; 343/909
(58) Field of Classification Search
USPC .......... 340/572.1–572.8, 10.1, 10.2, 5.6; 343/878, 909
See application file for complete search history.

(56) References Cited

U.S. PATENT DOCUMENTS

| | | |
|---|---|---|
| 5,767,789 A | 6/1998 | Afzali-Ardakani et al. |
| 6,441,740 B1 | 8/2002 | Brady et al. |
| 6,917,292 B2 | 7/2005 | Watanabe et al. |
| 6,922,173 B2 | 7/2005 | Anderson |
| 2002/0130778 A1 | 9/2002 | Nicholson |
| 2005/0114690 A1 | 5/2005 | Rodriguez et al. |

OTHER PUBLICATIONS

PCT ISR dated Jul. 7, 2008, 20 pages.
Ben A. Munk, "Frequency Selective Surfaces: Theory and Design," John Wile & Sons, Inc., New York, pp. 1-400, 2000.
Richard C. Johnson, "Antenna Engineering Handbook," McGraw-Hill, Inc., New York, (3rd Ed.), pp. 1-4, 46-23, 1993.
Office Action mailed on Apr. 14, 2009 in counterpart U.S. Appl. No. 11/641,782, Richard T. Knadle Jr., filed Dec. 20, 2006.
Office Action mailed on Nov. 6, 2009 in counterpart U.S. Appl. No. 11/641,782, Richard T. Knadle Jr., filed Dec. 20, 2006.
Ex parte Quayle Action mailed on Jul. 1, 2010 in counterpart U.S. Appl. No. 11/641,782, Richard T. Knadle Jr., filed Dec. 20, 2006.
Notice of Allowance and fees due mailed on Oct. 1, 2010 in counterpart U.S. Appl. No. 11/641,782, Richard T. Knadle Jr., filed Dec. 20, 2006.

(Continued)

*Primary Examiner* — Tai T Nguyen
(74) *Attorney, Agent, or Firm* — Terri Hughes Smith; Kenneth A. Haas

(57) ABSTRACT

The present invention is directed to systems that use frequency selective surfaces (FSS) to aid in the operation of radio frequency identification (RFID) devices and products. In one embodiment, a system for interrogating radio frequency identification (RFID) tags includes a conveyor belt and an RFID reader. The conveyor belt has a first surface and a second surface. The first surface is configured to receive an item to which an RFID tag is affixed and the second surface is configured to slide on a metal slide plate. The RFID reader is configured to transmit instructions embodied in a radio frequency (RF) signal to the RFID tag, wherein the metal slide plate is positioned between the RFID reader and the RFID tag and comprises a frequency selective surface that is substantially transparent to the RF signal.

12 Claims, 14 Drawing Sheets

(56) References Cited

OTHER PUBLICATIONS

International Preliminary Report on Patentability for International Application No. PCT/US2007/073432 mailed on Jul. 2, 2009.
European Search Report for European application No. 10014758.6 mailed on Aug. 11, 2011.
European Office Action for European Application No. 07840404.3 mailed on Oct. 1, 2009.
European Notice of Allowance for European application No. 07840404.3 mailed on Oct. 21, 2010.
Restriction Election Requirement Office Action mailed on Feb. 10, 2009 in counterpart U.S. Appl. No. 11/641,782, Richard T. Knadle Jr., filed Dec. 20, 2006.
Ex Parte Quayle Action Dated Feb. 24, 2012 for Counterpart U.S. Appl. No. 12/912,430.

US 8,514,079 B2

FREQUENCY SELECTIVE SURFACE AIDS TO THE OPERATION OF RFID PRODUCTS

The present application is a divisional application of, and claims priority and full benefit under 35 U.S.C. §120 of previous U.S. Pat. No. 7,884,718, for FREQUENCY SELECTIVE AIDS TO THE OPERATION OF RFID PRODUCTS, filed Dec. 20, 2006, and assigned to Symbol Technologies, Inc., and which is incorporated herein by reference in its entirety.

BACKGROUND OF THE INVENTION

1. Field of the Invention

The present invention is generally directed to radio frequency identification (RFID) technology.

2. Background Art

RFID tags are electronic devices that may be affixed to items whose presence is to be detected and/or monitored. The presence of an RFID tag, and therefore the presence of the item to which the tag is affixed, may be checked and monitored by devices known as "readers." Readers typically transmit radio frequency (RF) signals to which the RFID tags respond. Each RFID tag can store a unique identification number or other identifiable information. The RFID tags respond to the reader by backscatter transmitting their identification numbers or other identifiable information, so that the tags can be identified.

The environment in which an RFID tag is located may adversely affect a reader's ability to read the RFID tag. RFID tags may be affixed to a wide variety of products. These products may be located in many different kinds of environments. The different kinds of environments may have differing, and potentially adverse, effects on the RF signals transmitted and received by a reader. Specifically, the environment may be RF opaque, RF reflective, and/or RF absorptive. For example, an RFID tag affixed to a product that is located within a metallic container cannot be properly read from outside the metallic container because the metallic container is RF opaque. As another example, an RFID tag affixed to a product that is located face-down on a metallic shelf cannot be properly read because the product is RF opaque and the metallic shelf is RF reflective.

Given the foregoing, what is needed is an improved method and system for reading RFID tags.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 9A:
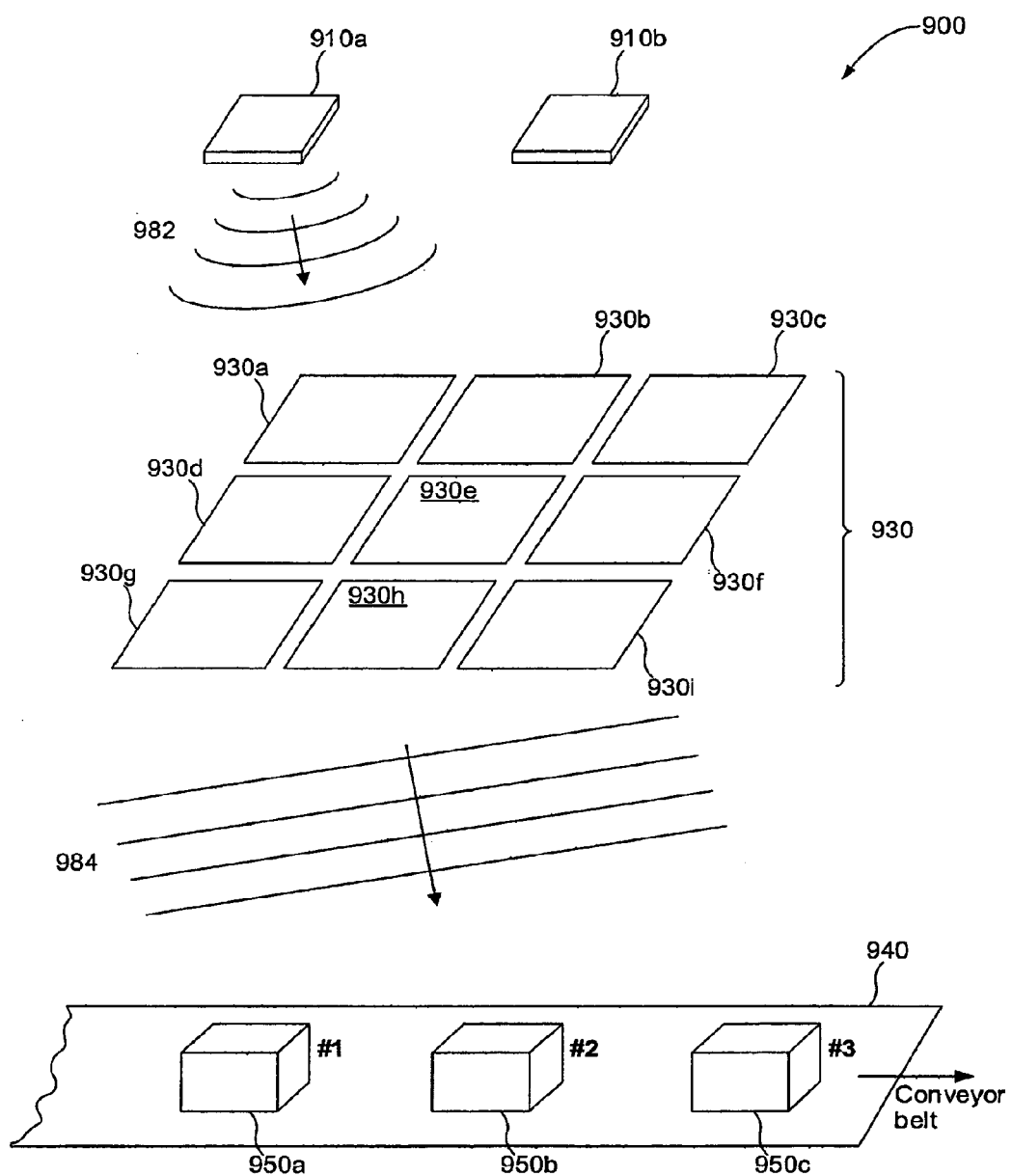
Figure 9B:
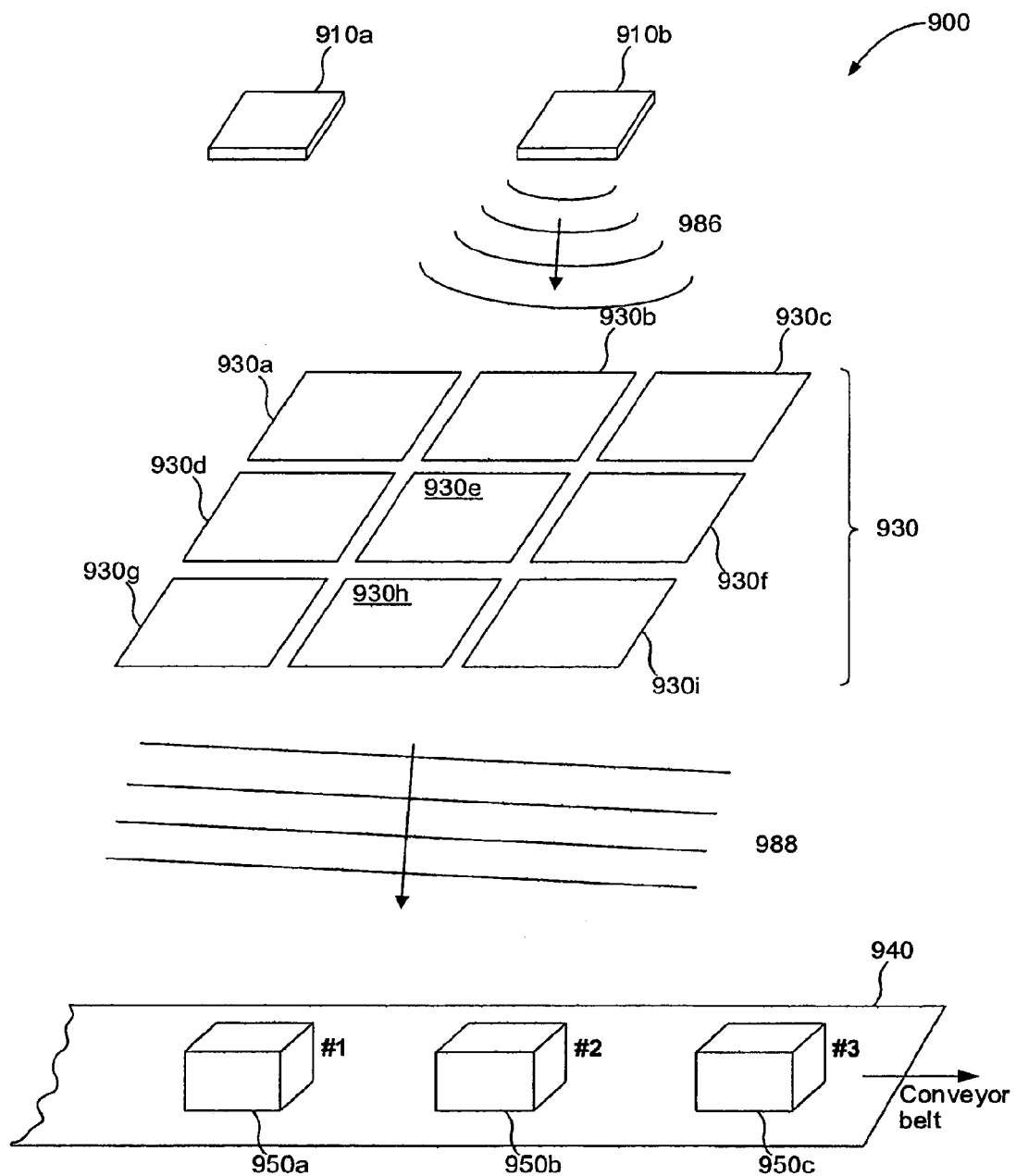
Figure 9C:
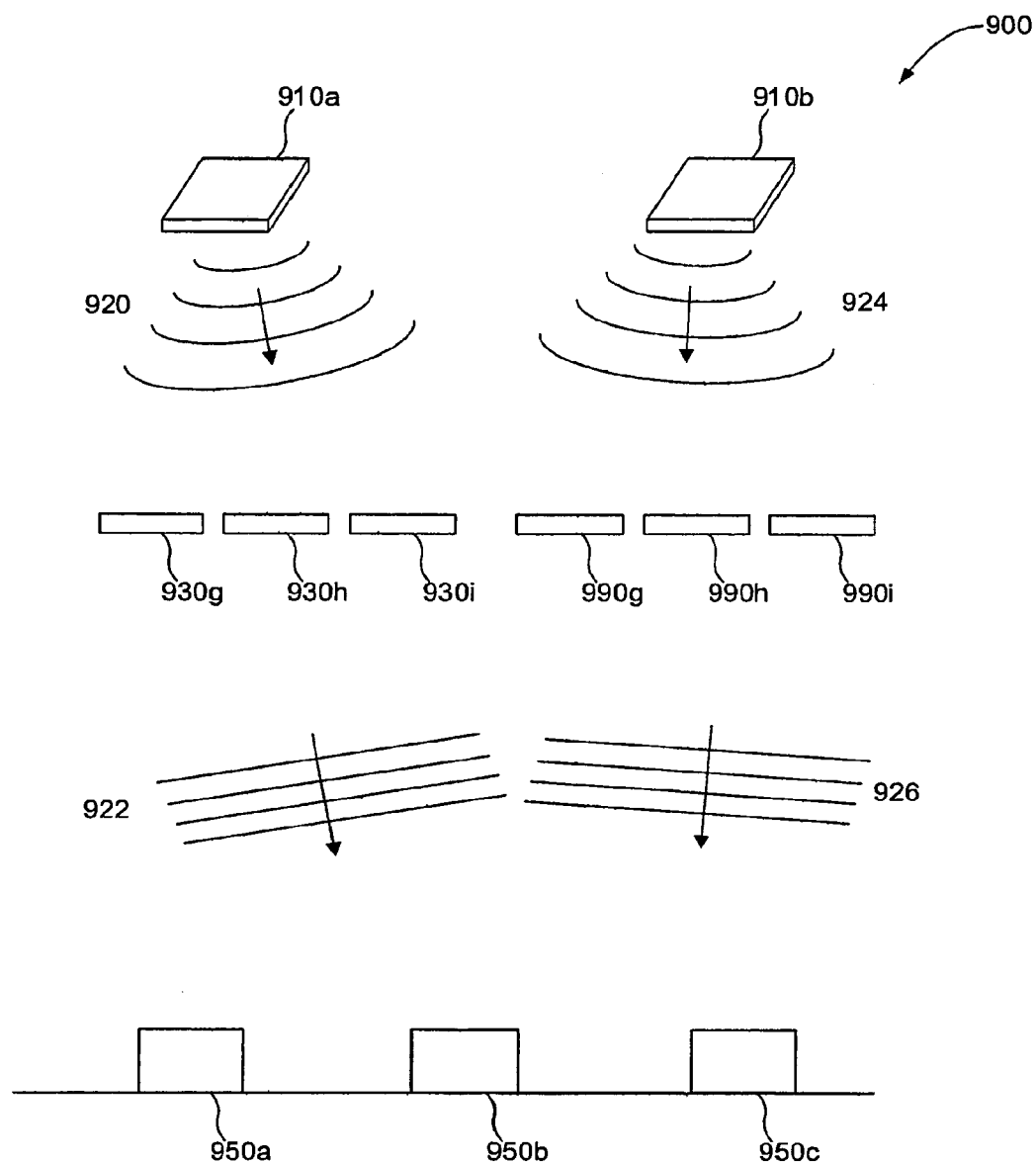

FIGS. 9A, 9B, and 9C illustrate an example system that utilizes at least one frequency selective surface panel to increase a RFID read range in accordance with an embodiment of the present invention.

Figure 10:
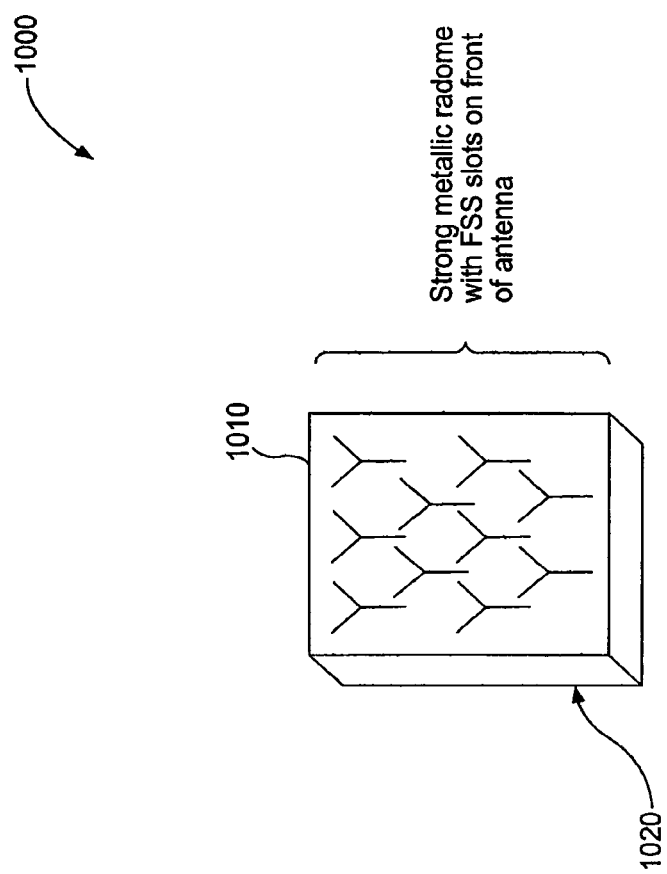

FIG. 10 illustrates an example radome comprising frequency selective surface slots in accordance with an embodiment of the present invention.

Figure 11:
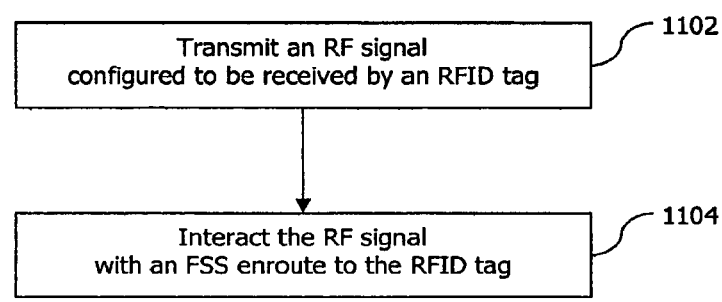

FIG. 11 depicts a flowchart illustrating an example method for interrogating an RFID tag in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

Embodiments of the present invention are directed to RFID products that utilize a frequency selective surface (FSS) to provide improved functionality and performance. As described in more detail herein, an FSS is a surface having specially designed elements that have a predetermined effect on electromagnetic waves that are incident thereon. The elements of an FSS vary depending on whether the FSS has transmission properties, reflective properties, or band stop properties. For a transmission-type FSS, the elements typically comprise slots and/or gaps. For a reflective-type or band stop-type FSS, the elements typically comprise complimentary structures. In accordance with an embodiment of the present invention, the use of an FSS in combination with an RFID antenna provides solutions to at least three example classes of problems.

A first example class of problems is associated with the diverse types of environments in which RFID tags are located. These environments may have adverse effects on the RF signals that are sent and received by RFID tags and antennas during interrogation of the RFID tags. For example, such an environment may be, or may include features that are, RF opaque, RF reflective, and/or RF absorptive. As described in more detail herein, FSS technology is used in accordance with an embodiment of the present invention to reduce such adverse effects, and thereby improve RFID tag reads.

A second class of problems derives from the limited read range of RFID tags. In some environments and situations, it is desirable for an RFID antenna to be situated in a location that is outside the normal read range of an RFID tag. For example, it may be desirable to situate an RFID antenna on a ceiling, while RFID tags are located on a floor below. In this example, the ceiling may be sufficiently high that the RFID tags are outside the normal RFID tag read range. As described in more detail herein, FSS panels are used in accordance with an embodiment of the present invention to increase the read range of an RFID tag. In this embodiment, the increased read range is achieved without violating FCC requirements and intentions.

A third class of problems is associated with the physically abusive environments in which some RFID readers are located. For example, RFID readers located at U.S. borders may be damaged by impacts from objects that protrude from vehicles traversing the borders. As described in more detail herein, an RFID reader in accordance with an embodiment of the present invention is housed within a metallic radome, including at least one FSS panel. The metallic radome is both physically strong and RF transparent. In an embodiment, the FSS panel is designed to enhance the performance of the RFID reader by controllably affecting RF signals transmitted and/or received by the RFID reader, as described in more detail herein.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Overview of RFID Technology

Figure 1:
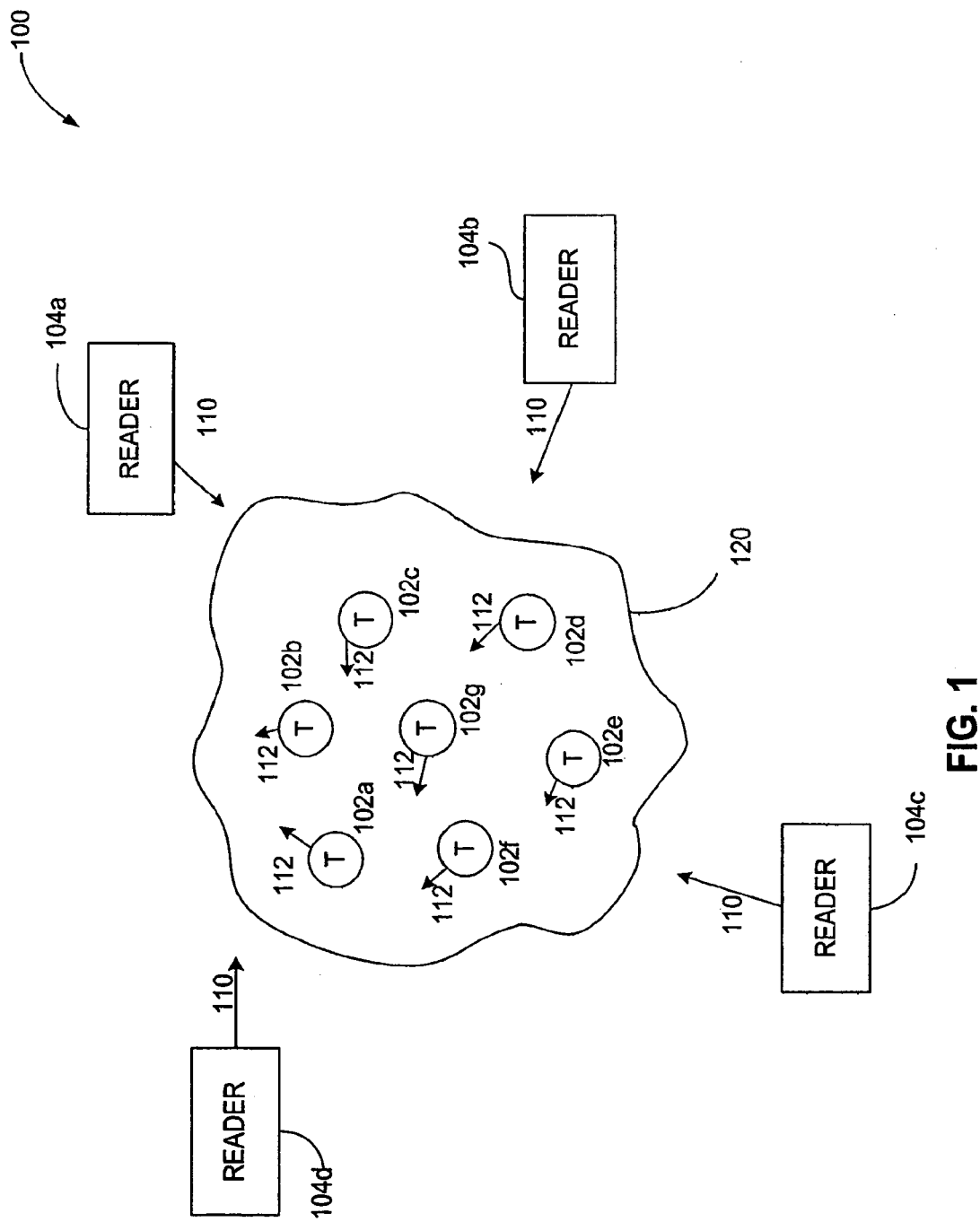
FIG. 1 illustrates an environment where RFID readers communicate with an exemplary population of RFID tags in accordance with an embodiment of the present invention.

Before describing embodiments of the present invention in detail, it is helpful to describe an example environment in which embodiments of the present invention may be implemented. FIG. 1 illustrates an environment 100 where RFID tag readers 104 communicate with an exemplary population 120 of RFID tags 102. As shown in FIG. 1, the population 120 of tags includes seven tags 102$a$-102$g$. According to embodiments of the present invention, a population 120 may include any number of tags 102.

Environment 100 also includes readers 104$a$-104$d$. Readers 104 may operate independently or may be coupled together to form a reader network. A reader 104 may be requested by an external application to address the population of tags 120. Alternatively, reader 104 may have internal logic that initiates communication, or may have a trigger mechanism that an operator of reader 104 uses to initiate communication.

As shown in FIG. 1, a reader 104 transmits an interrogation signal 110 having a carrier frequency to the population of tags 120. The reader 104 operates in one or more of the frequency bands allotted for this type of RF communication. For example, frequency bands of 902-928 MHz and 2400-2483.5 MHz have been defined for certain RFID applications by the Federal Communication Commission (FCC). Furthermore, due to regulatory or operational considerations, reader 104 may change carrier frequency on a periodic basis (e.g., ranging from 50 to 400 milliseconds) within the operational band. In these "frequency hopping" systems, the operational band is divided into a plurality of channels. For example, the 902-928 MHz frequency band may be divided into 25 to 50 channels, depending upon the maximum bandwidth defined for each channel. The maximum allowable bandwidth for each channel may be set by local or national regulations. For example, according to FCC Part 15, the maximum allowed bandwidth of a channel in the 902-928 MHz band is 500 kHz. Each channel is approximately centered around a specific frequency, referred to herein as the hopping frequency.

In one embodiment, a frequency hopping reader changes frequencies between hopping frequencies according to a pseudorandom sequence. Each reader 104 typically uses its own pseudorandom sequence. Thus, at any one time, a first reader 104$a$ may be using a different carrier frequency than another reader 104$b$.

Various types of tags 102 transmit one or more response signals 112 to an interrogating reader 104 in a variety of ways, including by alternatively reflecting and absorbing portions of signal 110 according to a time-based pattern or frequency. This technique for alternatively absorbing and reflecting signal 110 is referred to herein as backscatter modulation. Tags 102 can also use different types of encoding techniques (such as, FM0 and Miller encoding) and modulation techniques (such as, amplitude shift keying and phase shift keying modulation). However, other and more complex encoding and modulation methods (for example, Trellis encoding and quadrature amplitude modulation) may be utilized in embodiments of the present invention. Reader 104 receives response signals 112, and obtains data from response signals 112, such as an identification number of the responding tag 102.

Figure 2:
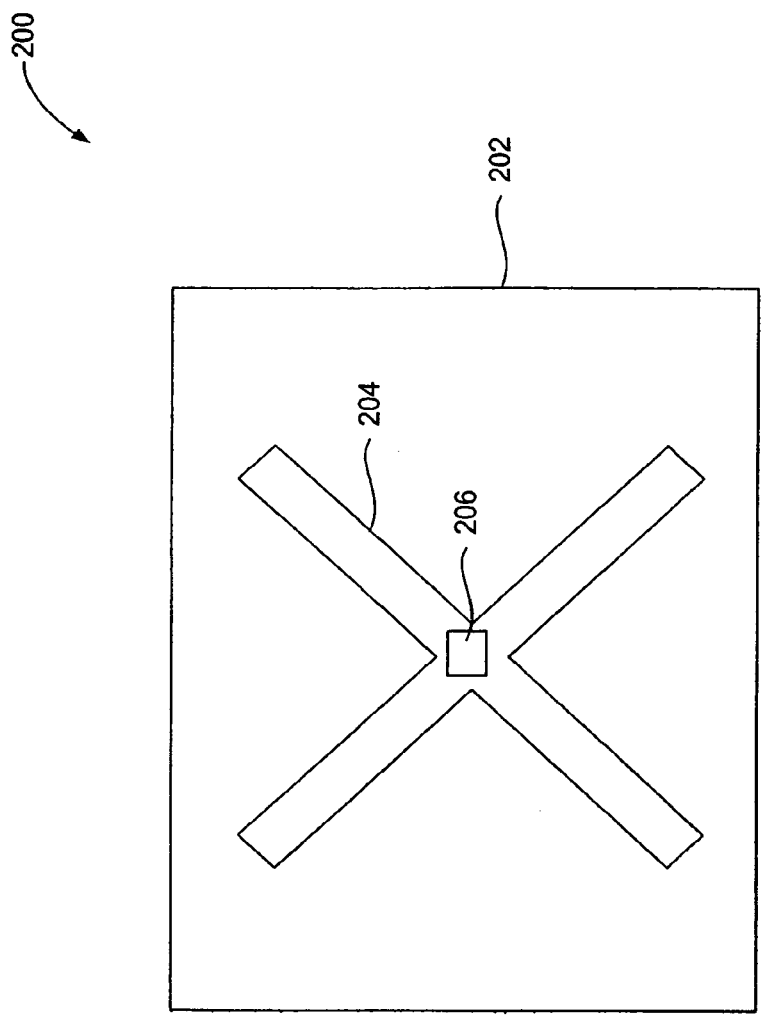
FIG. 2 shows a plan view of an example RFID tag in accordance with an embodiment of the present invention.

The present invention is applicable to any type of RFID tag. FIG. 2 shows a plan view of an example radio frequency identification (RFID) tag 200. Tag 200 includes a substrate 202, an antenna 204, and an integrated circuit (IC) 206. Antenna 204 is formed on a surface of substrate 202. Antenna 204 may include any number of one or more separate antennas. IC 206 includes one or more integrated circuit chips/dies, and can include other electronic circuitry. IC 206 is attached to substrate 202, and is coupled to antenna 204. IC 206 may be attached to substrate 202 in a recessed and/or non-recessed location. IC 206 controls operation of tag 200, and transmits signals to, and receives signals from RFID readers using antenna 204. Tag 200 may additionally include further elements, including an impedance matching network and/or other circuitry such as a transducer or transducers that measure such parameters as temperature, pressure, light (IR, optical, UV, etc.), acceleration, voltage, mechanical deflection, acoustics (subsonic, sonic, ultrasonic, etc.), etc. The present invention is applicable to tag 200 (e.g., a semiconductor type tag), and to other types of tags, including surface wave acoustic (SAW) type tags.

Figure 3:
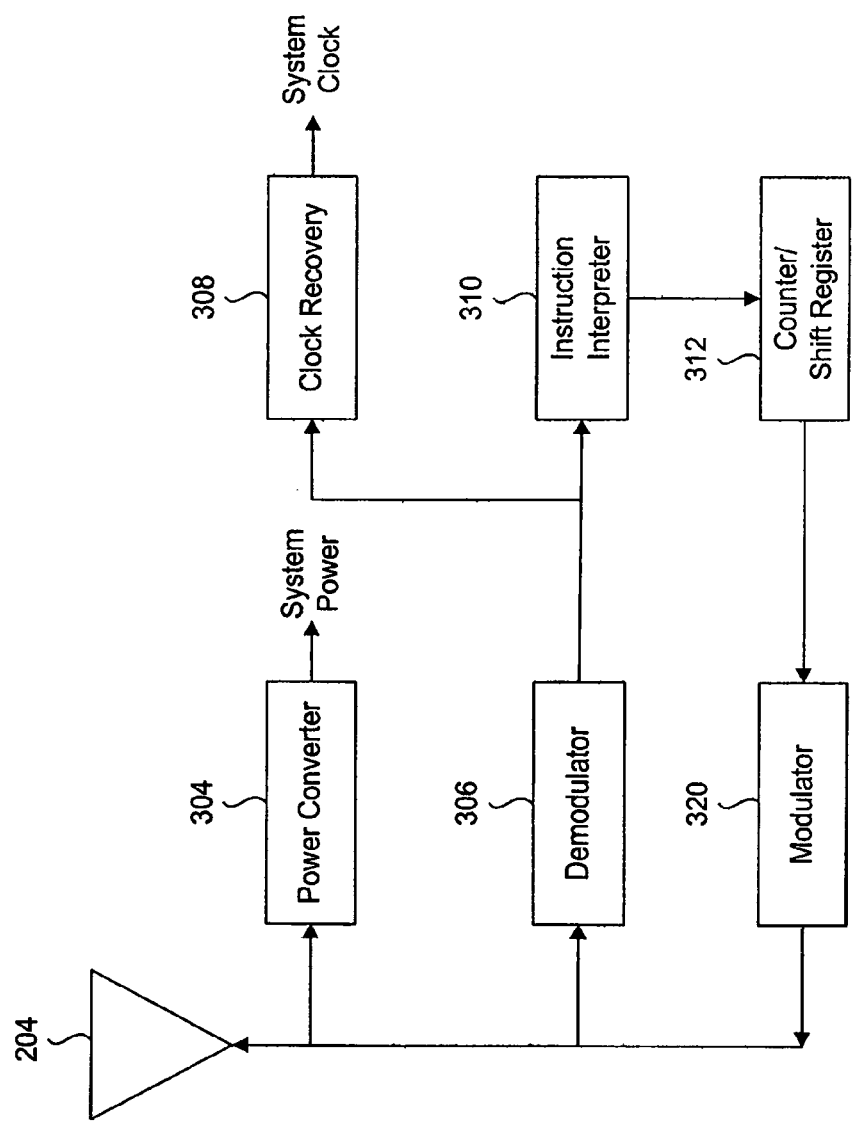
FIG. 3 illustrates a circuit block diagram of an RFID tag in accordance with an embodiment of the present invention.

Now the architecture of the tag is described. FIG. 3 is a circuit block diagram of RFID tag 102 according to an embodiment of the present invention. The particular circuit of FIG. 3 is presented by way of example only. Other circuits can be employed without departing from the spirit and scope of the present invention, as would be apparent to one skilled in the relevant art. Tag 102 includes at least one antenna 204, a power converter 304, a demodulator 306, a clock recovery circuit 308, an instruction interpreter 310, a counter/shift register 312, and a modulator 320. There are versions of an RFID tag using the Aloha protocol (for instance) where the tag has no instruction interpreter 310; it simply responds multiple times with a series of randomized hold-off times whenever it receives a signal of sufficient power, such as the charging signal transmitted by the RFID reader. In an embodiment, antenna 204 is an omnidirectional antenna, with its impedance usually matched to the frequency of transmission.

In the depicted embodiment, system power for each tag is provided by a charging signal transmitted by the reader prior to the tag reading operation. Power converter 304 is used to convert the received charging signal to system power. Such power converter circuits are well known in the art. In an embodiment, the charging signal need only be present for a short time to fully charge the tags. In an alternative embodiment (not shown), power converter 304 is replaced by a battery. In that embodiment, the tag reader 104 is not required to transmit a charging signal.

In an alternate embodiment, power controller 304 is augmented by a storage capacitor. In this embodiment, storage capacitor provides a tag with operating power when it is too far away from the reader to be charged by the charging signal. Also, in an alternate embodiment, power converter can be an energy harvester. Energy harvesting involves capturing RF energy in any portion of the RF spectrum and converting the energy into electrical power signals as opposed to information signals. Energy harvesting is well known to persons skilled in the relevant arts. For a tag 102, energy harvesting properties are determined by the characteristics of antenna 204. Dipole, tripole, quadrapole, loop, or fractal antennas (for instance) are all well suited to both energy harvesting and tag 102 operation, and are well known to persons skilled in the relevant arts.

Demodulator 306 receives signals from tag reader 104 via antenna 204. In an embodiment, the received signals comprise a charging signal and one or more instructions. These instructions are described in detail below. One such instruction includes a count instruction that instructs the tags to increment their counter/shift registers 312. In one embodiment, the count instruction causes counter/shift registers 312 to increment by one; in alternative embodiments, the instruction causes counter/shift registers 312 to increment by other values.

In an embodiment, the instructions are transmitted by tag reader 104 using an amplitude-modulated RF signal using a several hundred kilohertz baud rate and a 900 megahertz carrier frequency. Tag reader 104 may vary the bit rate of these transmissions. For example, tag reader 104 may reduce the bit rate if it senses the existence of a noisy RF environment. The instructions are sent by the reader with a "return to center" data format; this format is well-known in the art. The instructions are decoded by tag 102 to generate digital input for instruction interpreter 310 and a system clock. The system clock is recovered by clock recovery circuit 308.

Figure 4:
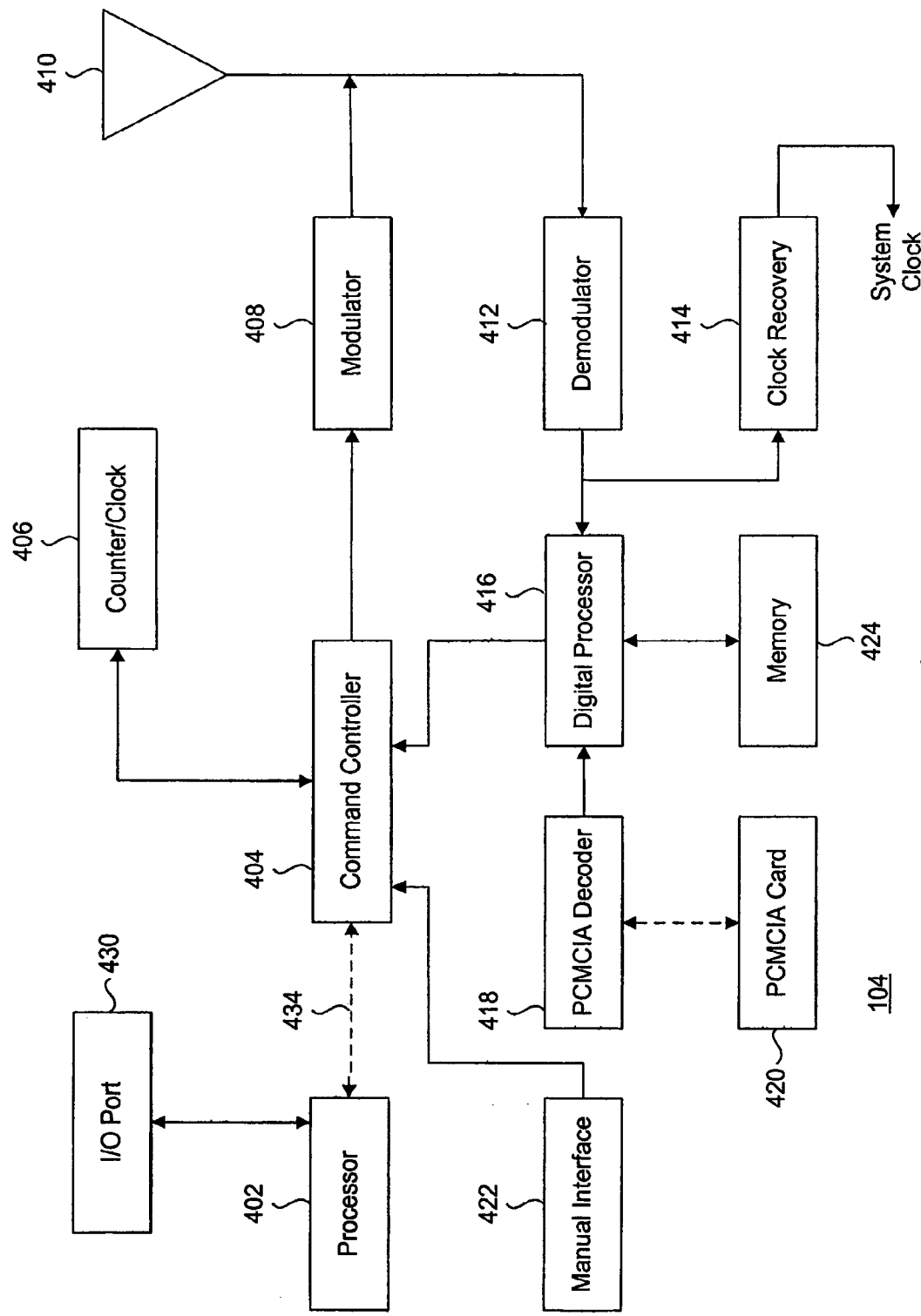
FIG. 4 illustrates a circuit block diagram of the architecture of a RFID tag reader in accordance with an embodiment.

The architecture of tag reader 104 is now described. FIG. 4 is a circuit block diagram of the architecture of tag reader 104 according to an embodiment. The circuitry of tag reader 104 is described in three categories: generic circuitry, processing circuitry, and application-specific circuitry.

Referring to FIG. 4, tag reader processing circuitry is represented by processor 402. Processor 402 performs high level processing functions not provided by tag reader generic circuitry. These high level functions include compiling inventory lists, handling time slot contentions, coordinating the display of content of an RFID tag received by tag reader 104, and the like, as would be apparent to one skilled in the relevant arts. In an embodiment, processor 402 is coupled to an I/O port 430. Processor 402 may be physically co-located with tag reader 104, or may be physically separate from tag reader 104. The connection 434 between processor 402 and command controller 404 may be hard-wired or wireless.

Application-specific tag reader circuitry is represented by PCMCIA (Personal Computer Memory Card International Association) card 420. In an embodiment, details regarding specific tags, applications, encryption scheme, sensor configuration and data, and modes of operation to be used can be embodied in PCMCIA card 420. In this embodiment, a generic tag reader 104 can be used for multiple inventory applications by merely using different PCMCIA cards.

The remaining circuitry in FIG. 4 comprises tag reader generic circuitry. This is the circuitry used by tag reader 104 to perform generic functions under the control of processor 402 and one or more PCMCIA cards 420. The generic circuitry shown in FIG. 4 is provided for illustrative purposes only, and not limitation. Generic tag reader circuitry includes command controller 404, counter/clock 406, modulator 408, one or more antennas 410, demodulator 412, clock recovery circuit 414, digital processor 416, memory 424, PCMCIA decoder 418, and manual interface 422.

Command controller 404 generates data and instructions under the control of processor 402. These data and instructions are transmitted via modulator 408 and antenna 410 to tags 102. Tag transmissions are received via antenna 410 and demodulator 412 by digital processor 416, which communicates with processor 402 via command controller 404. In an embodiment, digital processor 416 is a physically distinct processor from processor 402. In another embodiment, digital processor 416 is not a separate physical component from processor 402. In this embodiment, digital processor 416 comprises computing processes embodied in processor 402 that parse digital signals received from an RFID tag (such as RFID tags 102). In one embodiment, a system clock may be derived by clock recovery circuit 414 for use in analyzing tag transmissions. The PCMCIA card 420 is coupled to tag reader 104 via a PCMCIA decoder 418. Manual interface 422 provides the operator with control over the tag reader 104.

III. Overview of Frequency Selective Surfaces

As described herein, frequency selective surfaces are used in accordance with embodiments of the present invention to improve RFID tag reads. Before describing such embodiments, however, it is helpful to provide an overview of frequency selective surfaces. A more detailed description of FSS may be found in Ben A. Munk, *Frequency Selective Surfaces: Theory and Design* (2000), the entirety of which is incorporated by reference herein.

A frequency selective surface (FSS) is a surface that is specially designed to have a predetermined effect on signals that are incident thereon. For example, the FSS technique may be used to cause a surface to become substantially transparent or substantially reflective to selected RF signals. The FSS technique may be utilized on several different types of surfaces. Such surfaces may included, but are not limited to, metallic surfaces, conductive surfaces, dielectric surfaces, and/or combinations thereof. Based on the FSS design of a surface, the transparency or reflectivity of the surface may be a function of one or more characteristics of an incident electromagnetic signal(s). The characteristics of the incident electromagnetic signal(s) may include, but are not limited to, (1) frequency, (2) polarization, (3) angle of incidence, (4) chirality (meaning the synthesizing of complex chiral and metamaterials that favor certain senses of circular polarization, or present an equivalent dielectric constant that is less than 1.0 or negative), (5) a combination of (1), (2), (3), and/or (4), or (6) some other characteristic as would be apparent to a person skilled in the relevant art(s). In this way, for example, an FSS may be designed to be transparent to electromagnetic signals within a selected range of frequencies, a selected range of polarizations, and/or a selected range of incident angles. For signals that impinge upon the FSS that fall outside of the selected range(s) of frequencies, polarizations, and/or incident angles, the FSS acts primarily as a non-transparent object.

By using complimentary FSS techniques, such as an array of conductive dipoles, tripoles, anchor elements, loops, spirals, etc., that are supported by a sheet of essentially non-conductive material (such as a dielectric material), it becomes possible to design a type of FSS that is primarily reflective to signal that possess the correct (1) frequency, (2) polarization, (3) angle of incidence, (4) chirality, and/or (5) a combination of (1), (2), (3), (4), or (6) some other characteristic as would be apparent to a person skilled in the relevant art(s). For signals that impinge upon the FSS that fall outside of the selected range(s) of frequencies, polarizations, and/or incident angles, the complimentary type FSS acts primarily as a transparent object.

In addition to the above-mentioned intentional transparency characteristics, or intentional reflective characteristics, the FSS technique may be used to modify the phase front of a propagating signal. For example, the FSS technique may be used to (i) focus, (ii) de-focus, (iii) re-direct, (iv) control the re-radiation pattern, and/or (v) modify the polarization and (vi) chirality characteristics of the propagated signal. Thus, FSS structures can serve as a type of spatial filter, as well as a type of propagating signal modifier, for signals that have certain initial characteristics. Thus, the FSS characteristics can be designed to favor and/or modify the signals that propagate through the FSS material. At the same time, the FSS characteristics can be designed to favor and/or modify the signals that are reflected and/or back scattered from the FSS material.

An FSS comprises a collection of repeated elements, such as slots, gaps, or their compliments. The type of elements varies depending on the desired characteristics of a particular FSS. An FSS band-pass structure usually comprises slots or gaps (often with complex shapes) that are cut into the side of a piece of conductive material. An FSS band-stop structure usually comprises complimentary structures, such as metallic dipoles, that are suspended in a sheet of dielectric material. The repeated elements of an FSS (either band pass or band stop) can be of various shapes, including but not limited to straight lines (dipoles), Y-shaped slots (tripoles), end-loaded tripoles (anchor elements), crossed elements (a Jerusalem Cross), square spirals, loops, combinations of the foregoing shapes, and even more elaborate elements as would be apparent to a person skilled in the relevant art(s).

The orientation and arrangement of the elements of an FSS structure may be varied to achieve various amounts of electronic coupling between the elements. The electronic coupling (partially) controls the FSS structure's RF signal characteristics. As mentioned above, such signal characteristics may include, but are not limited to, frequency, bandwidth, polarization, equivalent dielectric constant (or the index of refraction), angles of incidence, as well as auxiliary re-radiation characteristics such as grating lobes, signal redirecting characteristics, and signal focusing or de-focusing characteristics. FSS structures may also be arranged in multiple layers. Often, inert or dielectric spacers are placed between each layer in a multi-layer structure. Such multi-layer structures are used to further control the response characteristics concerning frequency, bandwidth, polarization, incident angles, grating lobes, signal redirecting, signal focusing (or de-focusing) characteristics, chirality, and/or other response characteristics as would be apparent to a person skilled in the relevant art(s).

Figure 5:
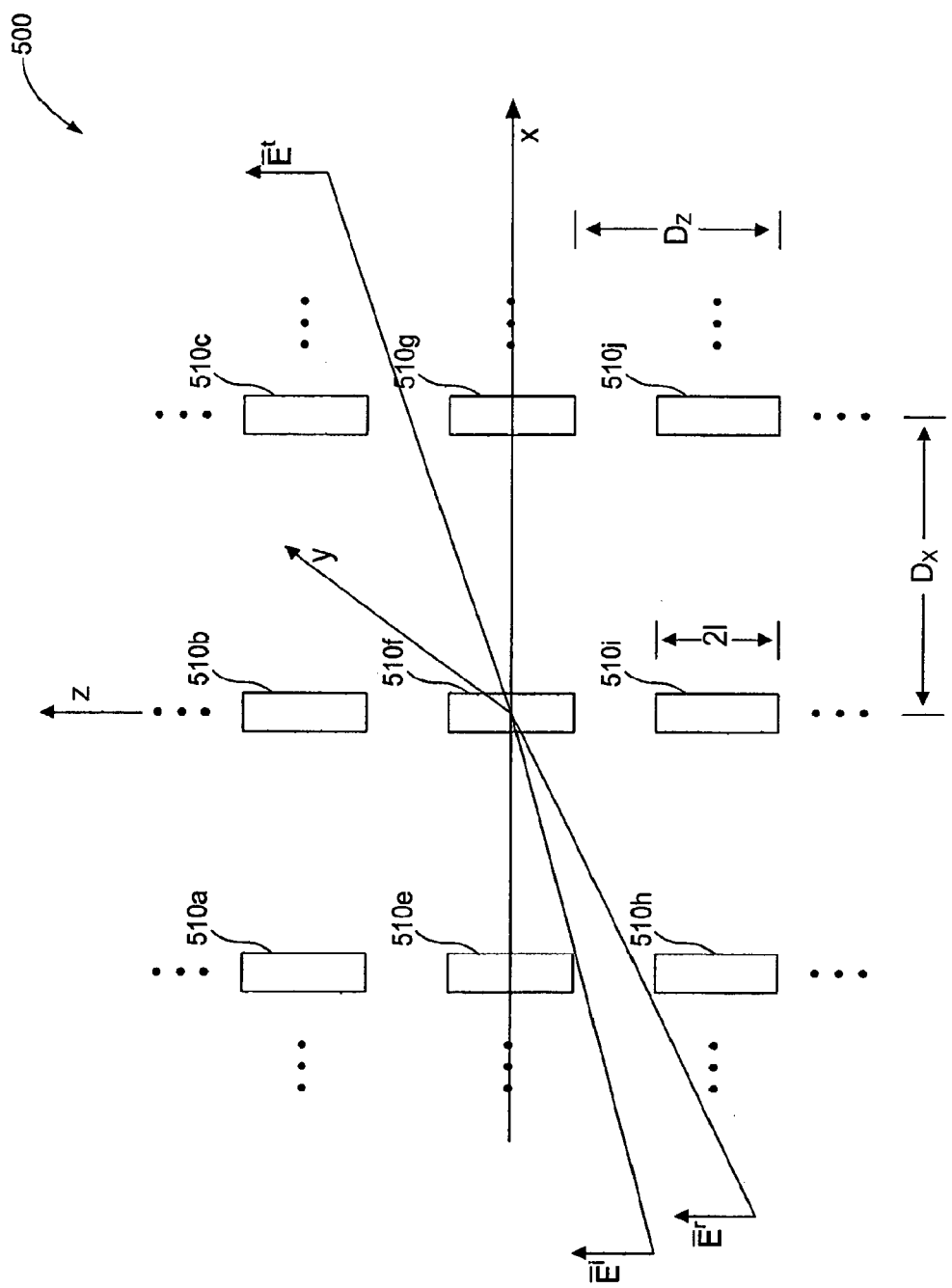
FIG. 5 illustrates a periodic structure of an example frequency selective surface.

FIG. 5 depicts a diagram 500 that includes a collection of periodic elements of an FSS. As shown in FIG. 5, diagram 500 includes periodic elements 510a-510j. Although diagram 500 only includes nine periodic elements, it is to be appreciated that a periodic structure may include more or less than nine periodic elements. The periodic elements 510 are separated by a distance, $D_x$, in the x-direction and a distance, $D_z$, in the z-direction. Where multiple layers of FSS materials are in use there can also be an intentional variation in the separation between one or more of the layers in the $D_y$ direction as a method of controlling the desired RF characteristics.

Periodic elements 510 are excited by an incident plane wave $E_i$ (a complex vector). The incident plane wave $E_i$ is partly transmitted through the region including periodic elements 510 and partly reflected from the region including periodic elements 510. The transmitted plane wave is labeled $E_t$ (a complex vector) and the reflected plane wave is labeled $E_r$ (a complex vector). A reflection coefficient, $\Gamma$ (a complex vector), for periodic elements 510 may be defined as $$\Gamma = \frac{E_r}{E_i}.$$

In a similar manner, a transmission coefficient, $\tau$ (a complex vector), for periodic elements 510 may be defined as $$\tau = \frac{E_t}{E_i}.$$

The $E_i$, $E_t$, and $E_r$ signals are labeled as complex vectors to indicate that they contain an amplitude, a direction, and an RF phase angle. Similarly, for simple planar FSS materials the reflection coefficient ($\Gamma$) and the transmission coefficient ($\tau$) are complex vectors that contain amplitude, direction and an RF phase angle. In the more general case of multiple layers of FSS materials that may be non-planar, and/or possess properties that are intentionally modulated throughout the volume of the total FSS material, the reflection coefficient (F), and the transmission coefficient (t) can take on the property of a three dimensional matrix of complex vectors that is sometimes referred to as a complex tensor space. Depending on the design and orientation of periodic elements 510, the reflection coefficient, $\Gamma$, and the transmission coefficient, $\tau$, may be a function of the frequency, polarization, chirality, and/or angle of incidence of the incident plane wave $E_i$.

Depending on the design of the FSS it is to be understood that the transmitted signal $E_t$ (sometimes referred to as the re-radiated signal $E_t$) may not be in-line with the incident signal $E_i$, there may be multiple $E_t$ signals at various angles (often called side lobes)), and there may be a component or components of $E_t$ that exist(s) in the y-direction. The polarization and chirality of the $E_t$ signal (or signals) may also differ from the $E_i$ signal. The reflected signal $E_r$ may contain a component that follows the rule that the angle of incidence equals the angle of reflection, and by proper design of the FSS the $E_r$ signal (or signals) may differ from this angle (often called reflection side lobes). There may also be an $E_r$ component that propagates in the reverse $E_i$ direction (often called the back scatter signal).

Although periodic elements 510 are shown as straight lines (dipoles), it is to be appreciated that periodic elements 510 may comprise various other shapes. For example, period elements 510 may include, but are not limited to, Y-shaped slots (tripoles), end-loaded tripoles (anchor elements), crossed elements (a Jerusalem Cross), square spirals, loops, combinations of the foregoing shapes, and even more elaborate elements as would be apparent to a person skilled in the relevant art(s).

IV. Example Systems

As mentioned above, the FSS technique is used in accordance with an embodiment of the present invention to improve RFID tag reads. In embodiments of the present invention, the FSS technology is coupled with RFID technology to achieve one or more of the following: (A) to provide increased security with respect to products stored in shipping containers; (B) to facilitate reads of RFID tags placed face-down (for instance) on a conveyor belt; (C) to facilitate reads of RFID tags within a box bailer; (D) to improve the read range of RFID tags in, for example, an airport setting; (E) to provide a tough radome for RFID readers that are subject to physically abusive environments; and (F) to provide selected RF reflectivity (RF shielding) simultaneous with optical transparency in areas where shielding is required between the multiple RFID readers that are located at adjacent dock bay doors (for instance) so as to avoid tag reading at the wrong dock bay. These embodiments are described in more detail below.

A. Shipping Container

In accordance with an embodiment of the present invention, the FSS technique is used to allow controlled access to an RFID tag disposed in a shipping container.

Currently, approximately twenty one thousand shipping containers arrive at U.S. shipping ports each day. It is not possible to manually inspect each of these containers to determine whether the contents of the containers have been tampered with enroute to the U.S. port. To circumvent this manual inspection problem, the contents of many of these shipping containers are affixed with RFID tags that measure (and store the time-tagged history of) certain physical parameters, such as pressure, temperature, shock, acceleration, etc. RFID tags that measure such physical parameters may be used to electronically and quickly determine if the contents of a particular shipping container have been tampered with enroute to the U.S. port.

However, there are several problems with the electronic interrogation technique. One problem with this electronic interrogation technique is that a shipping container is opaque to RF signals, thereby making it difficult to interrogate the RFID tags contained in the shipping container. Another problem with this electronic interrogation technique is that unauthorized personnel could tamper with the contents of an RFID tag. For example, unauthorized personnel could damage the internal RFID tags with a strong RF field, they could break the code that allows addressing of the RFID tag, and/or they could re-write the information contained in the RFID tags. In particular, it has been shown that it is relatively easy to breach the security code of an RFID tag addressing function. During the cryptographers panel session at the RSA Conference 2006 at San Jose, Calif., it was shown, for example, that a "side-channel attack" method may be used to breach the security of an electronic product code (EPC) Class Gen-1 and Gen-2 RFID tag. At this session, it was also announced that these techniques could be used to crack the protection on an RFID tag embedded within a credit card, and thereby obtain the account information of the credit card holder.

In accordance with an embodiment of the present invention, FSS techniques are applied to the sheet metal of a shipping container to create an area of RF transparency (a kind of metallic radome or an RF window) in the side of the container. The FSS elements are oriented on the sheet metal to cause the transparency to be effective in frequency ranges at which RFID tags operation, such as UHF. The FSS area is designed to have an insertion loss that is a small fraction of a dB, and in some circumstances, the FSS area is designed to act as a converging lens, thus this will provide a passive system signal strength gain between the reader and the RFID tag. The FSS elements used in this embodiment may also comprise active electronic devices, thereby providing an increased signal strength gain between the reader and the RFID tag. The FSS material may be designed to modify the polarization characteristics, or to deflect the direction, of the interrogation signal that propagates through the FSS area so as to favor a particular RFID tag location within the container. This embodiment allows RFID tags that were hidden from RF view (due to the RF opaque environment of the shipping container) to be interrogated due to the RF transparency of the FSS area.

In a further embodiment, the FSS slot-type elements that are cut into the side of the shipping container are re-filled with a dielectric material (such as plastic or a ceramic) to achieve a desirable amount of RF transparency, while maintaining most of the physical strength and the pressure sealing characteristics of the sheet metal of the container. Additionally, the sheet metal may be reinforced in the area of the FSS modification without compromising the FSS RF characteristics, so that the mechanical integrity of the shipping container is maintained. For example, a technique called "sistering" may be used to provide strength reinforcement. In the sistering technique, two or more FSS panels are layered. The sistering technique may also be used to increase the security of the shipping container, as described in more detail below.

As mentioned above, one problem with RFID tags is that the information contained therein may be tampered with by unauthorized personnel. Making a shipping container RF transparent by installing FSS areas on the shipping container only makes it easier for unauthorized personnel to tamper with the content of RFID tags included in the shipping container. To overcome this problem, the sheet metal sistering technique is used in accordance with an embodiment of the present invention to allow the FSS transparency characteristic to be turned ON and OFF, as illustrated in FIG. 6.

Figure 6:
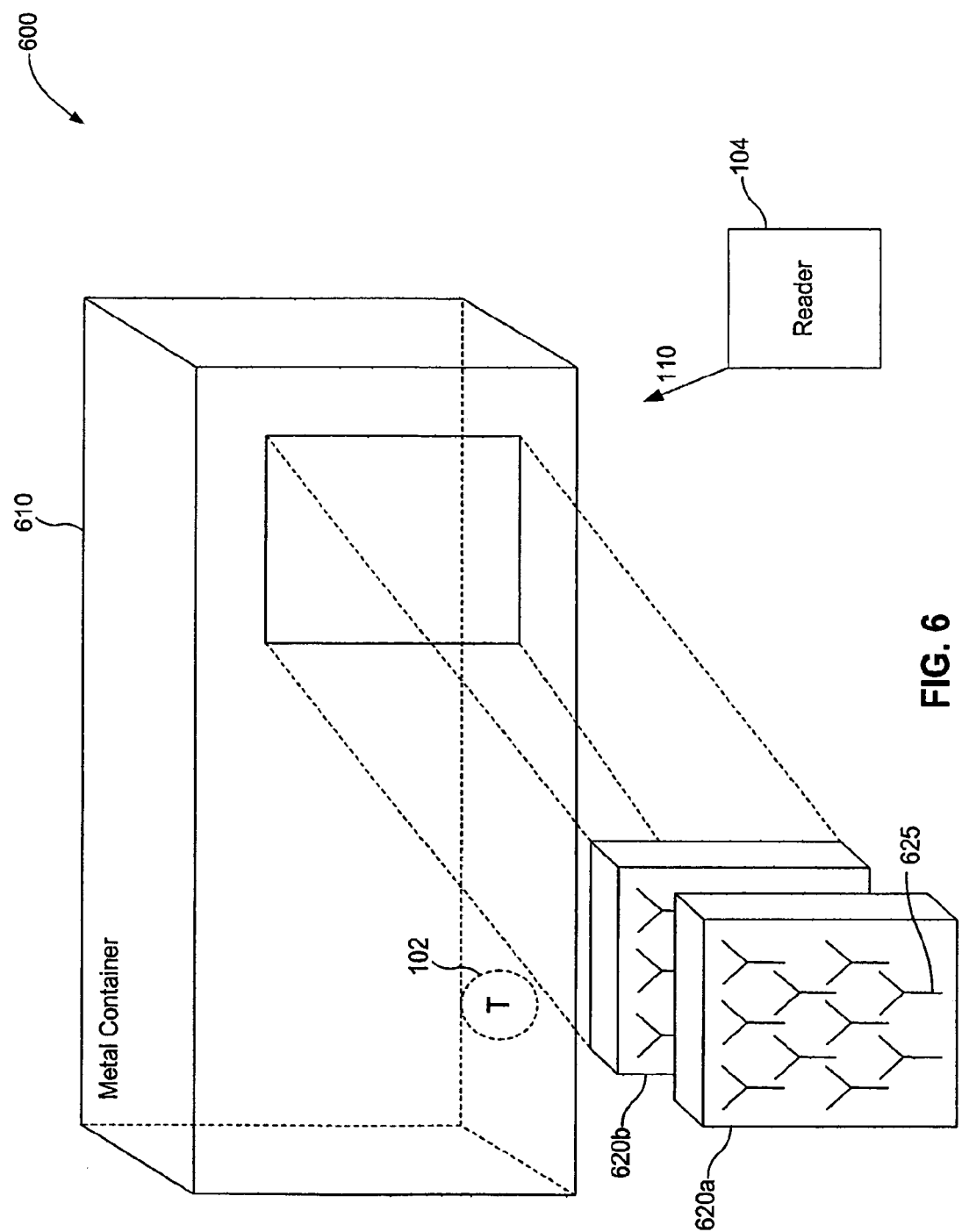
FIG. 6 illustrates an example system including a metal container having a frequency selective surface that provides secure interrogation of an RFID tag in accordance with an embodiment of the present invention.

FIG. 6 depicts a system 600 that includes a metal container 610 having an FSS in accordance with an embodiment of the present invention. Metal container 610 includes a first FSS panel 620*a* and a complementary second FSS panel 620*b*. First and second FSS panels 620*a* and 620*b* are configured to be transparent to RF signals, thereby enabling interrogation of RFID tag (or tags) 102 disposed in metal container 610. In addition, first and second FSS panels 620*a* and 620*b* may be oriented with respect to each other to negate this transparency, thereby preventing unauthorized personnel from tampering with the content stored on RFID tag 102. System 600 is described in more detail below.

Referring to FIG. 6, system 600 includes first and second FSS panels 620*a* and 620*b*. Each of FSS panels 620*a* and 620*b* includes periodic elements 625 that are configured to cause FSS panels 620 to have a desired effect on electromagnetic signals incident thereon. In an embodiment, periodic elements 625 are disposed on each FSS panel 620 to cause the combination of these panels to be transparent to RF signals when first FSS panel 620*a* is in a first position with respect to second FSS panel 620*b*. When first FSS panel 620*a* is in the first position, RFID reader 104 may interrogate RFID tag (or tags) 102 disposed in metal container 610 by transmitting RF signal 110 which passes through the combination of FSS panels 620.

System 600 enables controlled access to RFID tag (or tags) 102. As mentioned above, when in the first position, FSS panels 620*a* and 620*b* are substantially transparent to RF signals, such as RF signal 110 sent by RFID reader 104. However, when first FSS panel 620*a* is disposed in a second position with respect to second FSS panel 620*b*, the combination of FSS panels 620 are substantially non-transparent to RF signals. The second position may be achieved by displacing, translating, rotating, tilting, or a combination of displacing, translating, rotating and tilting first FSS panel 620*a* with respect to second FSS panel 620*b*.

In an embodiment, a key, such as, for example, a mechanical or electronic key, is necessary to unlock FSS panels 620 and orient them so as to be transparent to RF signals. A mechanical, electronic, hydraulic, or similar technique may be used to change the relative position of FSS panel 620a with respect to FSS panel 620b so as to change the over all FSS transparency. With this capability, only personnel possessing the key can orient FSS panels 620 so as to allow reading, and/or writing, to RFID tag (or tags) 102 that are disposed in metal container 610. As a result, this embodiment helps to prevent against unauthorized personnel tampering with RFID tag (or tags) 102 disposed in shipping container 610.

It is to be appreciated that the embodiment depicted in FIG. 6 is shown for illustrative purposes only, and not limitation. For example, although metal container 610 was described as a metal shipping container, it is to be appreciated that metal container 610 may be another type of container. Such other types of containers may include, but are not limited to, a refrigerator, a filing cabinet, a safe, or some other type of metal, or conductive, RF absorptive, or a high dielectric container that is RF disruptive, as would be apparent to a person skilled in the relevant art(s). In addition, although periodic elements 625 are illustrated as tripoles in FIG. 6, it is to be appreciated that other types of periodic elements may be used without deviating from the spirit and scope of the present invention. Such other types of periodic elements may include, but are not limited to, straight lines (dipoles), end-loaded tripoles (anchor elements), crossed elements (a Jerusalem Cross), square spirals, loops, combinations of the foregoing shapes, and even more elaborate elements as would be apparent to a person skilled in the relevant art(s).

B. Conveyor Belt

In accordance with an embodiment of the present invention, the FSS technique is used to facilitate interrogation of an RFID tag disposed face down on a conveyor belt.

A typical conveyor belt slides over top of a metallic slide plate. If an RFID tag affixed to a package is face down (or near the lower edge of the package, for instance) on such a conveyor belt, the RFID tag usually cannot be interrogated. An embodiment of the present invention overcomes this problem by using an FSS as the slide plate, thereby causing the usually Nylon plus rubber conveyor belt plus the metallic slide plate to be substantially RF transparent. Thus, an RFID reader antenna that is placed below the slide plate is able to interrogate the RFID tag that is affixed to (or placed near) the face-down surface of a package that is being transported by the conveyor belt system. In this embodiment, the physical strength and sealing characteristics of the metallic slide plate are maintained by filling the period elements of the slide plate with a tough dielectric material, such as plastic or ceramic.

Figure 7A:
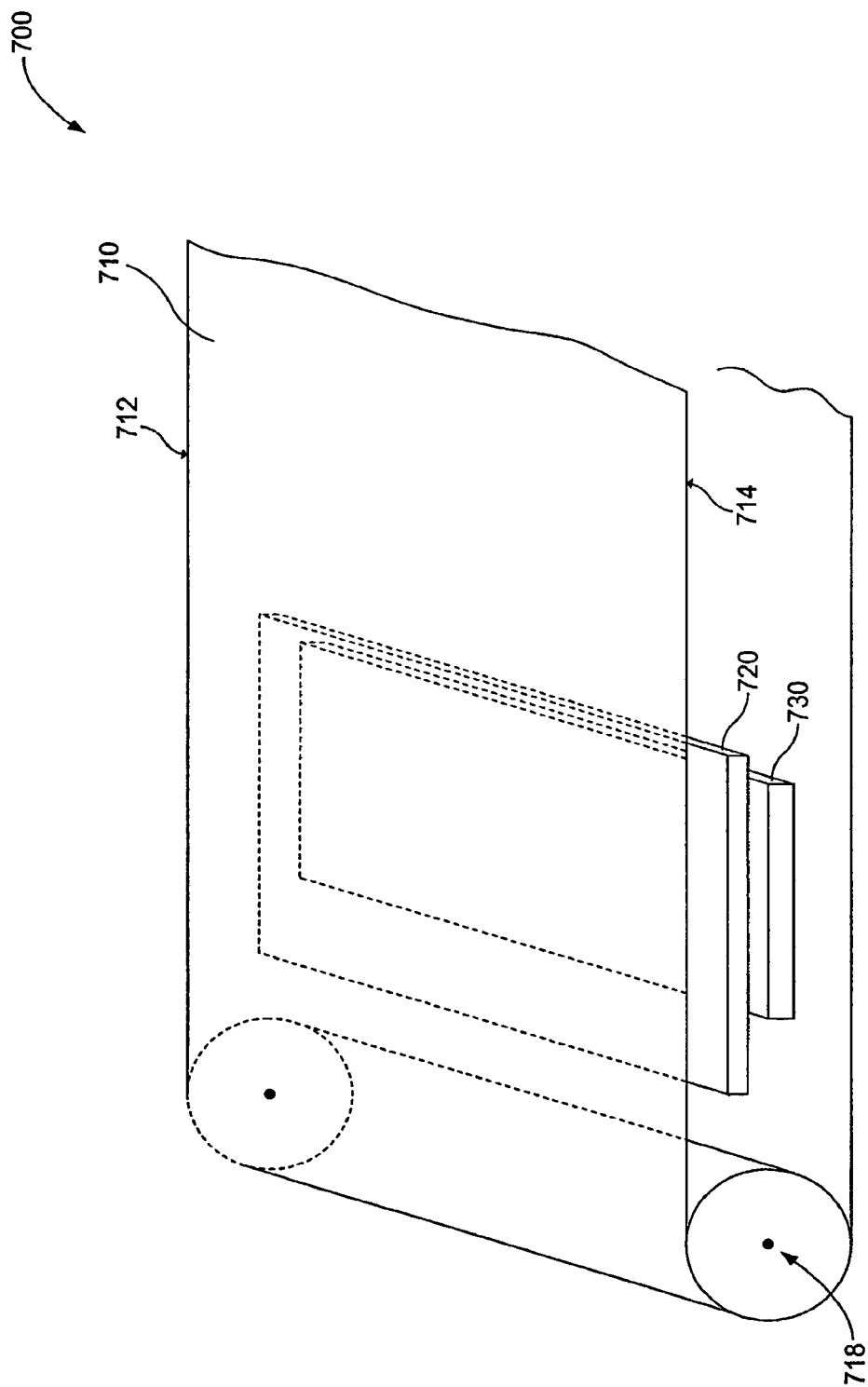
FIG. 7A illustrates an example conveyor belt system that incorporates a frequency selective surface to facilitate interrogation of an RFID tag in accordance with an embodiment of the present invention.

FIG. 7A depicts a conveyor belt system 700 that uses the FSS technique to facilitate interrogation of an RFID tag in accordance with an embodiment of the present invention. As illustrated in FIG. 7A, conveyor belt system 700 includes a conveyor belt 710, a slide plate 720, a turn-around drum 718, and an RFID reader antenna 730. The operation of conveyor belt system 700 will now be described in more detail.

Conveyor belt 710 includes a top side 712 and a bottom side 714. Top side 712 is adapted to receive a package to be transported on conveyor belt 710. In an example, the package may have an RFID tag affixed to it and the RFID tag may be oriented face down toward slide plate 720. Bottom side 714 of conveyor belt 710 is configured to slide over top of slide plate 720.

Drum turn-around 718 is configured to rotate and thereby cause conveyor belt 710 to move so that there is no relative motion between drum turn-around 718 and conveyor belt 710. In an embodiment, drum turn-around 718 rotates counter-clockwise causing conveyor belt 710 to move to the left. In another embodiment, drum turn-around 718 rotates clockwise causing conveyor belt 710 to move to the right. As mentioned above, conveyor belt 718 slides over top slide plate 720.

Figure 7B:
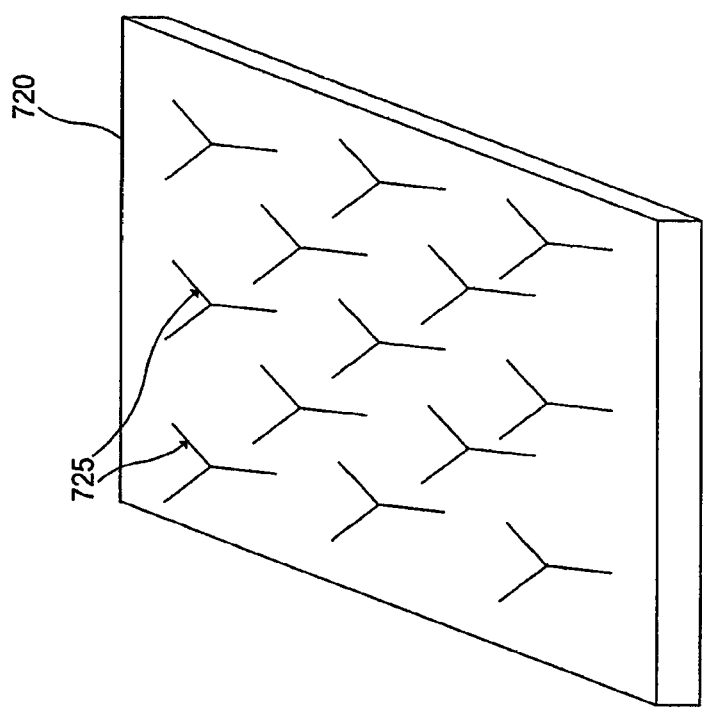
FIG. 7B illustrates an example frequency selective surface that is used as a slide plate in the conveyor belt system of FIG. 7A.

A more detailed view of slide plate 720 is illustrated in FIG. 7B. As illustrated in FIG. 7B, slide plate 720 includes a plurality of periodic elements 725. As mentioned above, periodic elements 725 may include, but are not limited to, straight lines (dipoles), end-loaded tripoles (anchor elements), crossed elements (a Jerusalem Cross), square spirals, loops, combinations of the foregoing shapes, and even more elaborate elements as would be apparent to a person skilled in the relevant art(s).

RFID antenna (or multiple antennas) 730 is (are) disposed below slide plate 720. Because slide plate 720 is composed of an FSS panel, and therefore is substantially transparent to RF signals, an RFID reader coupled to RFID antenna(s) 730 may interrogate RFID tags disposed face-down on (or near) conveyor belt 710 through slide plate 720 and conveyor belt 710.

In another embodiment, multiple RFID reader antennas are dispersed laterally or longitudinally along the conveyor belt slide plate, or along multiple slide plates. In this way, an RFID reader may perform a sequential antenna reading protocol, thereby significantly increasing the probability of reading all the RFID tags attached to all the packages being transported on the conveyor belt. A further benefit occurs when the timing of the reading of individual RFID tags has been correlated with the particular antenna that the reader is using at a particular time; this information allows the host computer to ascertain the relative positions of the individual packages. Such information is valuable to down-stream deflector hardware that is configured to divert the individual packages to their intended locations.

It is to be appreciated that FIG. 7A is presented for illustrative purposes only, and not limitation. It is to be appreciated that orientations other than those shown in FIG. 7A may be used. For example, although conveyor belt 710 is shown to be substantially horizontal in FIG. 7A, a person skilled in the relevant art(s) will appreciate that conveyor belt 710 may be disposed in a substantially inclined or substantially declined orientation. These and other orientations of conveyor belt system 700 are contemplated within the spirit and scope of the present invention.

C. Box Bailer

In accordance with an embodiment of the present invention, the FSS technique is used to facilitate interrogation of an RFID tag disposed in a box bailer (a type of box crusher).

Box bailers are used to dispose of boxes. Typically, the box that a product is shipped in is disposed of in a box bailer after the product has reached the end of the supply chain. To electronically verify that the product has reached the end of the supply chain, an RFID reader can interrogate an RFID tag affixed to the product's box in the box bailer. One problem with this scheme, however, is that a box bailer is an RF opaque object, which makes it difficult to interrogate RFID tags disposed within the box bailer. In a previously attempted solution, an RFID reader antenna was placed at the entrance of the box bailer. However, a box bailer acts as a multi-path reflector. As a result, this RFID reader antenna position caused a high percentage of false reads from RFID tags affixed to boxes outside the box bailer.

To overcome these problems, a box bailer in accordance with an embodiment of the present invention is equipped with an FSS patch. An RFID reader antenna is placed on the outside surface of the box bailer in cooperation with the FSS patch to enable interrogation of an RFID tag that is affixed to a box within the box bailer. This embodiment prevents the false-reading of RFID tags affixed to objects located outside of the box bailer.

Figure 8:
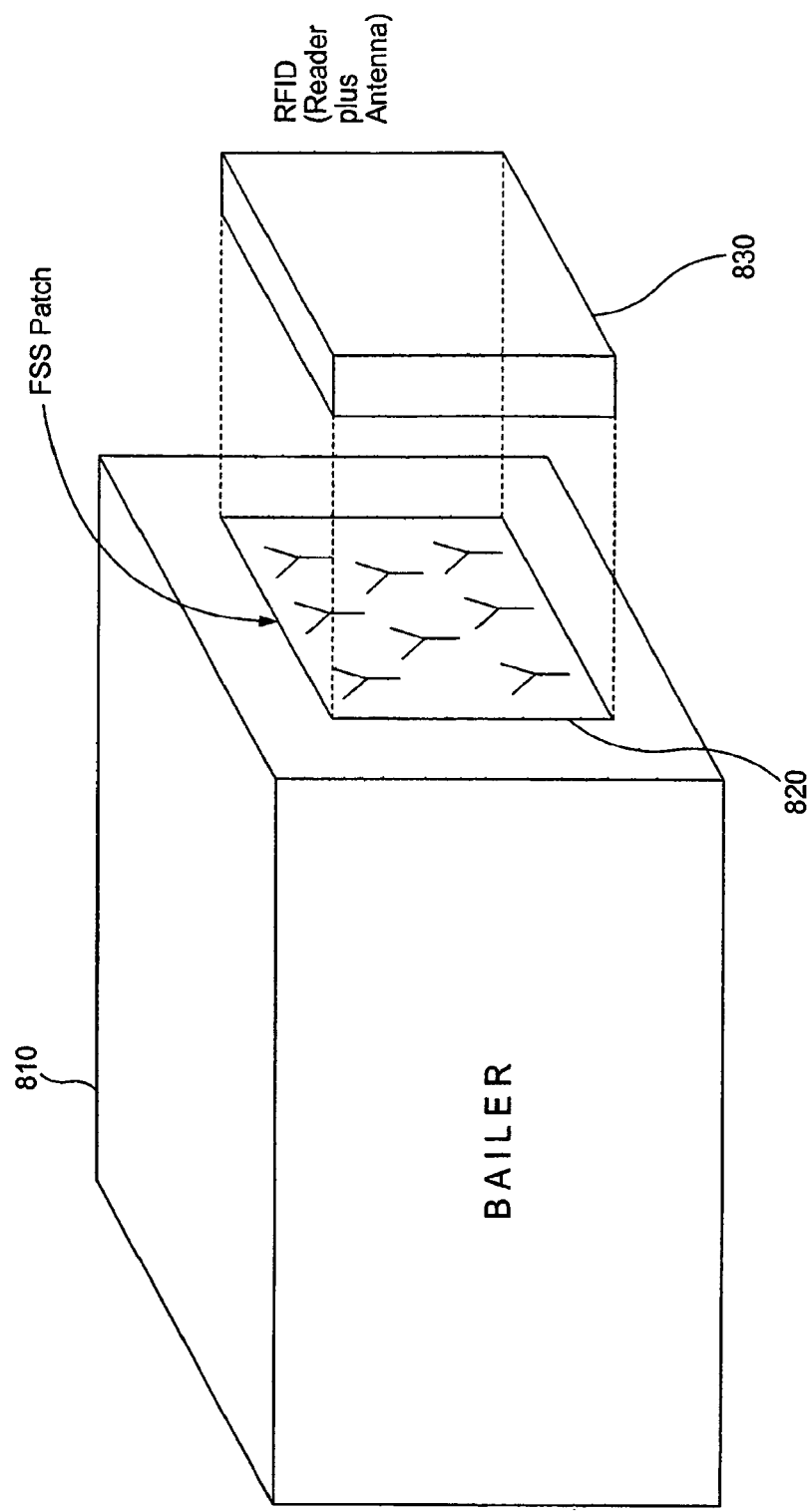
FIG. 8 illustrates an example system including a box bailer having at least one FSS in accordance with an embodiment of the present invention.

FIG. 8 depicts an example box bailer 810 that includes an FSS patch 820 in accordance with an embodiment of the present invention. As shown in FIG. 8, an RFID reader 830 is coupled to FSS patch 820. In this embodiment, RFID reader 830 may read an RFID tag disposed in box bailer 810, through FSS patch 820, without the false-reads of RFID tags caused by multi-path reflection as described above.

D. Improved Read Range

In accordance with an embodiment of the present invention, the FSS technique is used to improve the read range of an RFID reader.

In some situations it is not practical to place an RFID reader within the normal read range of an RFID tag. For example, in some environments (such as airport baggage claim areas or in a warehouse) the only convenient place to position an RFID reader antenna is near the ceiling, because a floor-mounted reader antenna would interfere with the normal traffic flow of people, baggage handlers, or fork lifts. In a ceiling location, the RFID reader antenna may be approximately 30 feet or more above the floor or the area at which RFID tags are to be read. Thirty feet is beyond the normal passive RFID tag reading range. In fact, it is rare that a passive RFID tag can be reliably read beyond 20 feet in a real environment, when the tagged products are near the floor (an RF reflective surface), and the tag may have an unfavorable orientation with respect to the reader antenna. Consequently, there are some environments in which conventional RFID read techniques cannot be used to reliably interrogate an RFID tag because the environment contains materials and conditions that are RF opaque, RF reflective, RF absorptive, and/or (nearly) out of range of normal passive RFID tags.

To overcome these problems, a system in accordance with an embodiment of the present invention utilizes FSS panels as a converging lens to increase the normal read range of a passive RFID tag. In this embodiment, the FSS panels increase a power flux density (PFD) of a signal sent by an RFID antenna and received by an intended RFID tag location. The PFD that the RFID tag actually receives is similar to that which the RFID tag would have received had the RFID antenna been closer to the RFID tag. In other words, by increasing the PFD this embodiment reduces the effective distance between the RFID antenna and the RFID tag.

Described below is an example system in which an RFID antenna is located on or near the ceiling and RFID tags are located on or near the floor below the ceiling. However, it is to be appreciated that this embodiment is presented for illustrative purposes only, and not limitation. An RFID antenna may be oriented in a different location and at a different distance with respect to an RFID tag without deviating from the spirit and scope of this embodiment of the present invention.

FIG. 9A depicts an example system 900 for increasing the read range of a passive RFID tag in accordance with an embodiment of the present invention. Described below is an embodiment in which system 900 is implemented in an airport baggage claim area. System 900 includes a first RFID antenna 910a, a second RFID antenna 910b and an FSS lens 930. In an embodiment, FSS lens 930 comprises, for example, nine FSS panels 930a-i as illustrated in FIG. 9A. However, FSS lens 930 may comprise a different number of FSS panels without deviating from the spirit and scope of the present invention. As described in more detail below, FSS lens 930 increases a PFD of a signal sent by RFID antennas 910. By increasing the PFD, FSS lens 930 enables RFID antennas 910 to interrogate RFID tagged items 950a-c disposed outside the normal read range of a passive RFID tag. As illustrated in FIG. 9A, RFID tagged items 950 are disposed on a conveyor belt 940 approximately 30 feet below RFID antennas 910.

FSS lens 930 comprises planar FSS panels 930a-i that are mounted at a chosen distance above the floor. FSS lens 930 provides RF focusing to enhance signals that flow between RFID antennas 910 and RFID tagged items 950. In appearance, FSS lens 930 is similar to sheets of drop ceiling material that are parallel to the floor. FSS lens 930 is mounted and installed in a similar fashion to drop ceiling material. In an embodiment, FSS lens 930 is usually made from one or more layers of metallic (or other conductive) sheets that have FSS elements cut into them, such as FSS panel 720 having elements 725 illustrated in FIG. 7B. As mentioned above, the FSS elements may include, but are not limited to, straight lines (dipoles), end-loaded tripoles (anchor elements), crossed elements (a Jerusalem Cross), square spirals, loops, or some other shape as would be apparent to a person skilled in the relevant art(s). The FSS elements cause FSS lens 930 to act on RF signals in a similar manner to how a convex magnifying glass, or a Fresnel lens, acts on visible light. In an embodiment, FSS lens 930 is made in ordered and (optionally) numbered sections for ease of construction, transporting, and installation.

The overall composite size of FSS lens 930 determines the gain of system 900, which relates to the overall path loss between RFID tagged items 950 and RFID antennas 910. By increasing the gain of system 900, the effective distance between RFID tagged items 950 and RFID antennas 910 is reduced. In an embodiment, FSS lens 930 is designed, for example, to cause the strength of an RF signal sent by RFID antennas 910 and received by RFID tagged items 950 to appear as though the distance between RFID antennas 910 and RFID tagged items 950 is only approximately 10 feet, even though RFID antennas 910 and RFID tagged items 950 are actually separated by approximately 30 feet. The 1/f number of FSS lens 930, which is the focal length to diameter ratio, is the primary factor that determines the gain (RF connectivity), and thus the effectiveness of system 900.

An example operation of system 900 is now described. As illustrated in FIG. 9A, first RFID antenna 910a can transmit an RF signal 982. RF signal 982 radiates outward within a radiation cone. Thereafter, RF signal 982 is incident on FSS lens 930. FSS lens 930 conditions RF signal 982 resulting in a collimated signal 984 that propagates toward RFID tagged item 950b. In this manner, first RFID antenna 910a may interrogate RFID tagged item 950b.

In a similar manner, second RFID antenna 910b can transmit an RF signal 986, as illustrated in FIG. 9B. RF signal 986 radiates outward from second RFID antenna 910b and then is incident on FSS lens 930. FSS lens 930 conditions RF signal 986 resulting in a collimated signal 988 that propagates toward RFID tagged item 950b. In this manner, second RFID antenna 910b may also interrogate RFID tagged item 950b.

Presented below is an approximate numerical example that illustrates how FSS lens 930 (e.g., the FSS drop ceiling material) improves the RFID tag reading performance of system 900. First, the calculated RFID tag reading performance of a conventional ceiling-mounted RFID antenna system (e.g., a system similar to system 900, but without the FSS drop ceiling material) is presented. Then, the calculated RFID tag reading performance of system 900 (i.e., a system with the FSS drop ceiling material) is presented.

An example performance of a conventional ceiling-mounted RFID antenna system is now presented. Many of the best RFID reader antennas in use are circular polarized, and have a gain of +9 dB over isotropic circular, which equals +6 dB over isotropic space when sensed with a linear receiving antenna (this is the FCC test procedure, and the maximum gain allowed). Thus, the reader antenna has approximately 68 degrees of beam width, and it transmits a one watt signal—the maximum allowed (with +6 dB of antenna gain), which) that becomes 4 watts (+36 dBm) of Effective Isotropic Radiated Power (EIRP) when sensed with a linear antenna, such as the RFID tag dipole antenna. Assuming that such an RFID reader antenna is mounted 30 feet above the floor where the luggage baggage carrousel is located (as in FIG. 9), the free space path loss is approximately −50.9 dB at 915 MHz. Assuming further that the RFID tag has an antenna gain of 0.0 dBi for an average tag orientation, the electronic portion of the RFID tag will experience a reader signal level of: +36−50.9+0.0=−14.9 dBm. It is well known that most RFID tags require a signal level of at least −10 dBm for reliable operation. Thus, the conventional ceiling-mounted RFID antenna system provides a reader signal to the RFID tag that will be 4.9 dB below threshold, even before considering the possible detriment of the RFID tag being mounted on an absorptive piece of baggage, or the RFID tag being flat against the carrousel.

An example performance of system 900 is now presented. Assume the RFID reader antenna is mounted on the ceiling that is approximately 30 feet above the floor where the airport baggage carrousel is located. Assume further that FSS lens 930 (i.e., the FSS drop ceiling lens material) is mounted at the mid point approximately 15 feet above the floor, which is also approximately 15 feet below the ceiling. With the ceiling mounted RFID reader antenna 910 located 15 feet from FSS lens 930, the reader antenna 3 dB beam width of 68 degrees will illuminate a circular patch that is 20 feet in diameter at FSS lens 930. Assume that one of the ordered groupings of FSS drop ceiling tiles are made into a converging lens with a lens diameter of 10 feet and a focal length of 15 feet. This kind of an FSS lens system will appear as a collimator that is focused on the reader antenna (which is nearly a point source of 1 foot in diameter), and it will create a collimated RF beam that will illuminate a spot approximately 10 feet in diameter at the floor level. The reader antenna main lobe 3 dB beam width contains about 80% of the radiated energy. The 10 foot diameter of the first FSS lens being considered will intercept more than one quarter of the radiated energy, or a total of about 20%. The collimation function of the lens will keep the RF Power Flux Density (PFD) nearly constant between the FSS lens and the floor. Thus, the RFID tags on pieces of baggage on the carrousel will behave as if the RFID reader was located 15 feet from the reader instead of the real distance of 30 feet. The 915 MHz free space loss for a 15 foot range is 44.9 dB, and almost all of the system that loss will be experienced within the path between the reader antenna and the FSS material. The collimated beam within the 15-foot path between the FSS material and the carrousel carousel will appear to be nearly lossless. Therefore, the RFID tag will experience a reader signal level of: +36−44.9+0.0=−8.8 dBm. Since the RFID tag requires a signal level of greater than −10 dBm, it is likely that the tag will have a healthy response.

It is to be appreciated that the above-described example is presented for illustrative purposes only, and not limitation. The assumptions used in the previous analysis are used to illustrate one of a number of possible scenarios. System 900 has many variables that can be changed, such as increasing the lens diameter to increase the signal strength, changing the lens focal length to increase or decrease the RF spot size (and signal strength) experienced at the floor level, or other similar types of variables as would be apparent to a person skilled in the relevant art(s) from reading the description contained herein. The altitude of the FSS drop ceiling can also be changed, and the FSS ceiling tiles can be changed in design so as to create a lens that favors RFID reader signal angles that are further from being perpendicular to the plane of the FSS material. This can also take the form where the RFID reader signal that is incident upon the FSS material is, by design of the FSS material, not parallel with the signal that is propagated through the FSS material. Such an offset design will favor a luggage handling scenario (for instance) where the space directly above the drop ceiling area (or above the luggage carousel area) is not available for mounting RFID reader antennas.

In the previous illustrative example drop ceiling tiles are assembled to approximate a 10 foot diameter round FSS lens that has a lens area of 78.5 square feet, and a focal length of 15 feet. In an embodiment, each drop ceiling tile of an FSS lens is constructed from, for example, a 3 foot by 3 foot square. In this embodiment, a total of 9 tile squares are used to construct a single 9 foot by 9 foot square lens of 81 square feet of area. The ordered grouping of 9 tiles can be constructed of 3 different tile types. The center tile can be constructed from one or more layers of FSS material (such as layers of aluminum foil, with FSS cut outs in them, sandwiching and glued to a foam panel) so as to simulate a high dielectric constant material that has a high index of refraction, and possibly a tapered index of refraction (a higher index of refraction in the center of the tile). Each of the 8 lens perimeter tiles can be constructed from one or more layers of FSS material that simulates a lower dielectric constant, and thus a lower index of refraction. A near optimum lens design can include two types of perimeter lens tiles: (1) a first type (of 4 tiles) for the four corners of the square lens; and (2) a second type (of 4 tiles) for the four sides of the square lens. Each of these tiles can have a tapered index of refraction, and an arrow printed on the surface indicating the preferred orientation of the perimeter tiles so as to assure that higher index of refraction portion of each perimeter tile is pointed toward the center of the lens; thus the total lens of 9 tiles performs as a double convex (or converging) lens.

FIG. 9C illustrates a side-view of an embodiment of system 900 that includes multiple drop ceiling lenses—including a first FSS lens 930 and a second FSS lens 990. In an embodiment, each FSS lens comprises nine FSS panels as described above and illustrated in FIGS. 9A and 9B. In FIG. 9C, only three of the nine tiles that comprise first FSS lens 930 are visible (namely, tile 930g, 930h, and 930i), because FIG. 9C depicts a side-view of system 900. Similarly, only three of the nine tiles that comprise second FSS lens 990 are visible in FIG. 9C (namely, tile 990g, 990h, and 990i). The approximately 10 foot diameter equivalent lens that consists of 9 drop ceiling tiles (for each lens) can that be duplicated multiple times throughout the total drop ceiling area in a kind of step-and-repeat function, with or without inert spaces between the lenses, depending on the overall system design.

An example advantage afforded by multiple lenses is that multiple RFID reader antennas (such as RFID reader 910a and RFID reader 910b) can accomplish multiple reads of the same RFID-tagged luggage 950b, by way of adjacent lenses 930 and 990. For example, as illustrated in FIG. 9C, first RFID reader 910a may transmit a first RF signal 920 that impinges on first FSS lens 930. First FSS lens 930 conditions first RF signal 920 so that a first collimated RF signal 922 emerges from first FSS lens 930. First collimated RF signal 922 is thereafter incident on RFID-tagged luggage 950b. In this way, first RFID reader 910a can interrogate RFID-tagged luggage 950b. In a similar manner, as illustrated in FIG. 9C, second RFID reader 910b may transmit a second RF signal 924 that impinges on second FSS lens 990. Second FSS lens 990 conditions second RF signal 924 so that a second collimated RF signal 926 emerges from second FSS lens 990. Second collimated RF signal 926 is thereafter incident on RFID-tagged luggage 950b. In this way, second RFID reader 910b can interrogate RFID-tagged luggage 950b. The multiple reads of the same luggage piece from different read angles multiplies the probability of reading the RFID tag, and improves the accuracy of locating the piece of luggage. In addition, the multiple angles of tag reading partially overcomes the disadvantage of the RF multipath that exists in almost all environments, which often causes a tag reading difficulty.

In a further embodiment, the RF signal emitted by a particular RFID reader ceiling-mounted antenna (such as RFID reader 910a) impinges on multiple FSS drop ceiling lenses (such as first FSS lens 930 and second FSS lens 990). This embodiment allows the reading of multiple luggage tags that are present on multiple carousels.

In another embodiment, the sheet rock walls of a room are also constructed with conductive layers of FSS material so as to enhance the reading of RFID tag(s) that are located within the room while using an RFID reader(s) that is located outside of the room. The RFID tags(s) may be a telemetry type tag(s) that contains sensing circuitry, which sense, for example, pressure, temperature, light, vibration, voltage, acoustics, deflections, etc. In this way, a toxic environment (for instance) could be monitored from a safe location without the inconvenience of providing power to the monitoring circuitry (for instance). The telemetry type tag(s) monitoring capability allows the host computer to correlate which piece of luggage is mounted on which carousel. In this embodiment, a large number of ceiling mounted RFID reader antennas, with 4 or 8 antennas connected by transmission lines to each of a number of readers, can observe each of a number of baggage recovery carousel areas. Such a reader system redundancy significantly increases the probability of reading all RFID tags, it increases the probability of correctly locating each piece of luggage, and it causes no visual blockage or physical blockage to the flow people and baggage handlers that would occur if the reader antennas were attached to floor-mounted reader antenna support structures. In addition, the telemetry type tag(s) monitoring capability also allows the surveillance of human penetration of the environment within the room by the use of an RFID reader(s) that are located outside the room.

Although it may be possible to mount multiple RFID reader antennas at the fifteen foot level of the drop ceiling (assuming this space is accessible), this arrangement has several disadvantages, even though this arrangement would lower the required tag reading range. The 68 degree 3 dB beam width of each reader antenna would illuminate a 20 foot diameter of floor space (314 square feet each). This would create many tag locating ambiguities, even with a close-packing of multiple reader antennas. By comparison, the individual 10 foot diameter spots (78.5 square feet each) from each of the RF beams from each reader antenna in the 30 foot ceiling and 15 foot FSS drop ceiling embodiments presented above, when combined with the multiple reader antenna cross-correlating function presented above, will create a 4:1 area improvement in location ambiguity. The same degree of angular resolution and a 78.5 square foot floor foot print area at a 15 foot antenna altitude (a 37 degree antenna beam width) would require an antenna gain of 14.1 dB over isotropic circular, which is 5 dB above the FCC allowed maximum. Similarly, a 10 foot diameter floor foot print beam from a 30 foot antenna altitude (without the FSS drop ceiling material) would require a 19 degree beam width, and an antenna gain of 20 dBi circular, which is 11 dB above the FCC allowed maximum.

In an embodiment, system 900 is configured to provide polarization matching between an RFID reader and an RFID tag. Most RFID reader antennas transmit a circular polarized (CP) signal; either clockwise (often called right hand circular polarized signal [RHCP]) or counter clockwise (often called LHCP signal). In contradistinction, most tags include a linear polarized (LP) antenna. A circular polarized (CP) reader signal is usually chosen to accommodate the most number of tags which could each have various orientations. However, illuminating the LP antenna of an RFID tag with a CP signal from an RFID reader has disadvantages, as discussed in more detail below.

Generally speaking, in most environments, an RF signal from an RFID reader can reach an RFID tag from multiple paths, due to, for example reflective floors, walls, file cabinets, etc. It is also well known that RHCP signal will become a LHCP signal after reflection, and vice versa. If a RHCP signal is combined with a LHCP reflected signal, a primarily linear polarized (LP) signal may result. The resultant LP angle (horizontal, vertical, slant 45 degrees, etc.) is determined by the relative path lengths between the two signals (the direct path and the reflected path). If the resultant LP angle happens to be at a right angle to the RFID tag antenna, it is likely that the tag will receive little signal, and will not respond.

In a typical environment, an average RFID tag mounted on a piece of luggage will experience a direct signal from the RFID reader, and at least one indirect signal from the reflection of the carousel, the floor, near by people, etc. Typically reader antennas are deployed in counter-polarized pairs (half are RHCP, half are LHCP). Reversing the polarization sense at the reader antenna location, however, does not change the relative length of paths that the tags sees. Consequently, little or no correction of the resultant LP angle takes place.

The FSS drop ceiling material can correct (and improve) the condition of the multipath-caused cross-polarized LP signal that can negate a tag responding. It is well known that there is a type of FSS material that has been called a transmission-type polarizer—see, e.g., R. C. Johnson, "Antenna Engineering Handbook", McGraw-Hill, Inc, third edition, 1993, page 23-25 ("Johnson"), the entirety of which is incorporated by reference herein. The transmission-type polarizer described is popular in the design of certain types of circular polarized antennas. It converts a horizontal LP signal into a RHCP signal. Similarly, the same material converts a vertical LP signal into a LHCP signal. The transmission-type polarizer obeys the law of reciprocity, meaning it convert a RHCP signal into a horizontal LP signal, and the same piece of material converts a LHCP signal into a vertical LP signal. The FSS transmission-type polarization function and the FSS lens-focusing function are independent functions that can be combined within the same FSS lens; and in fact they tend to compliment each other. The meander line type of transmission-type polarizer described in Johnson is a type of artificial dielectric material that will simultaneously perform a focusing function within the drop ceiling FSS tiles.

As set forth above, first RFID reader antenna 910a (using first FSS lens 930) and second RFID reader antenna 910b (using second FSS lens 990) can each read luggage tag 950b by way of the two separate signal propagation paths. In an embodiment, first and second FSS lenses 930 and 990 comprise transmission-type polarizers. By configuring first and second reader antennas 910a and 910b to have opposite CP senses (such as one being a RHCP and the other being a LHCP) then the signal transmitted by first reader antenna 910a could arrive at luggage tag 950b as a horizontal LP signal, for example; and the signal transmitted by second reader antenna 910b could arrive at the same luggage tag 950b as a vertical LP signal, for example. This multiple LP reading scenario has at least three example advantages.

First, luggage tag 950b is read twice from two slightly different angles resulting in both a reading redundancy and an increased location accuracy. Second, the CP reflection-caused polarization-reversal problems are virtually eliminated. For example, the direct horizontal LP signal and the indirect (floor reflected) horizontal LP signal that were created by RHCP reader antenna 910a and lens 930a each combine to create a single horizontal LP signal at the luggage tag 950b. Similarly, the direct vertical LP signal and the indirect (floor reflected) vertical LP signal that were created by LHCP reader antenna 910b and lens 930b each combine to create a single vertical LP signal at the luggage tag 950b.

Third, it could be said that a CP antenna devotes half of the radiated power to horizontal LP and half the radiated power to vertical LP, and therefore the transmission-type polarizer lens combines each half of the radiated power of a single CP antenna into a single LP signal—the net result being an LP signal of twice the power (a 3 dB advantage). In the worse case, the resultant LP signal may be orthogonal to the particular orientation of luggage tag 950b, and the tag may not respond to the first reader signal. However, it will respond to the second reader signal which is of the opposite LP. If the tag is located 45 degrees from each LP, the response suffers a 3 dB loss, but since the LP signal is 3 dB stronger than it would be in the CP case, the situation is a break even.

As mentioned above, there are many ways to vary the FSS lens system 900 illustrated in FIGS. 9A, 9B, and 9C. When a transmission-type polarizer function is added to the FSS lens function, an RFID reader system designer now has the ability to adjust the system geometries and lens sizes (as previously mentioned). In addition, the RFID reader system designer may also adjust other system parameters, such as which, if any, of the lenses will be a transmission-type polarizer, what is the ideal dispersion of RHCP and LHCP reader antennas 910, should there be nearly co-located (separate antennas) or truly co-located RHCP and LHCP readers antennas at each ceiling location to multiply the luggage tag reading redundancy, and other similar system parameters as would be apparent to a person skilled in the relevant art(s). A truly co-located reader antenna is a type of RHCP or LHCP antenna where the CP sense can be selected electronically or mechanically, as discussed above.

The FSS transmission-type polarizer, discussed above, may also be used in other embodiments of the present invention. For example, selectable CP antenna types may be applied to the RFID reader environment, wherein a RHCP or a LHCP radiated signal is selected by changing an internal switch or by selecting a particular input connector. Such an antenna may be used in conjunction with FSS transmission-type polarizer material that is applied to embodiments of the present invention—such as, a shipping container (discussed herein with reference to FIG. 6), a box bailer (discussed herein with reference to FIG. 8), or a drop ceiling lens system (discussed herein with reference to FIGS. 9A, 9B, and 9C).

Such a system includes the added capability of scanning an environment that contains RFID tags and sequentially applying full linear power in each of two linear polarizations—such as horizontal, than vertical. Such a system possesses at least a 3 dB advantage in reading tags that are at the threshold of receiving the minimum required forward-link power that will initiate a reading function. An RFID tag might not receive the minimum required power for any of the following example reasons: an unfavorable orientation; an environmental RF multipath condition that causes a signal null at the tag; or an environmental multipath condition that causes a particular CP sense (such as RHCP) to become a resultant LP signal that is cross-polarized to the tag.

In an embodiment, a transmission-type polarizer is used to overcome technical RFID tag reading problems associated with FCC requirements. For example, the FCC requirement concerning the maximum allowable EIRP (+36 dBm over isotropic linear) will not allow the co-location of a transmission-type polarizer and a maximum gain (+9 dB over isotropic circular) antenna to radiate into an open area because the LP emitted signal would be +39 dBm/isotropic linear (3 dB above specification). However, in the case of the FSS lens drop ceiling embodiment (e.g., the embodiments discussed herein with reference to FIGS. 9A, 9B, and 9C), the signal emitted by the +9 dB antenna plus a +30 dBm transmitter becomes a +39 dBm isotropic circular signal, which equals a +36 dBm isotropic linear-sensed signal and is within the maximum allowable EIRP by the FCC.

In the embodiments illustrated in FIGS. 9A, 9B, and 9C, for example, the 15 foot of free space loss (−44.8 dB) to the FSS drop ceiling (FSS lenses 930 or 990) brings the signal down to a −8.8 dBm over isotropic linear PFD (which also equal a PFD of 15 milliwatts per square meter), where the FSS drop ceiling lens (e.g., first FSS lens 930 and/or second FSS lens 990) gathers a portion of the available signal (in the example given), and re-directs the signal to a designated area at floor level that includes RFID tags. As set forth above, the maximum allowable PFD is not exceeded anywhere along the path. However, in accordance with FCC requirements, a transmission-type polarizer plus a selectable CP antenna is allowed to radiate into a closed environment, such as a shielded shipping container or a box bailer that has the door closed. When either of these systems are operating with the door opened, the transmitted power is lowered to ½ watt to stay within the FCC RF radiation limit.

Because FSS material can be used to change the wave front of a propagating RF signal, in an embodiment the FSS drop ceiling or wall material is designed as a deflecting lens in which the main portion of the signal leaving the FSS material is not in line with the incident signal. This type of operation can be useful when the available ceiling area or wall area is not located in line with the RFID tag(s) that are being read.

In this embodiment, an FSS lens provides simultaneous servicing to a number of areas within the airport. This is accomplished by deploying a number of ceiling-mounted illuminating antennas (separate reader antennas). Each antenna (used one at a time per reader) provides a signal at a particular angle of arrival to the FSS lens. The FSS lens, in turn, re-focuses the signal to a particular floor location. For example, as illustrated in FIG. 9C, first RFID antenna 910a transmits a first RF signal 920 that impinges on first FSS lens 930. First FSS lens 930, in turn, redirects first RF signal 920 to be received by second RFID tagged item 950b. In a similar manner, second RFID antenna 910b transmits a second RF signal 924 that impinges on second FSS lens 990. Second FSS lens 990, in turn, redirects second RF signal 924 to be received by second RFID tagged item 950b. Thus, first and second FSS lenses 930 and 990 provide a focusing function, whereby RF signals are focused on particular locations.

In an embodiment, the angles of arrival of signals transmitted by RFID antennas 910 (such as first RF signal 920 and second RF signal 924) are approximately 30 to 40 degrees from the normal (i.e., perpendicular to the receiving surface). Beyond these angles of arrival the performance tends to degrade due to the mildly de-focusing affects of coma distortion and spherical aberration. In an embodiment in which the angle of arrival is beyond approximately 40 degrees from the normal, a second FSS lens is horizontally displaced from FSS lens 930, and a second set of illuminating RFID antennas is provided. In this embodiment, the combination of a first and second set of RFID antennas and FSS lens provide an overlapping area in which RFID tagged items may be interrogated. An RFID tagged item that is located at a location that is within the overlapping area may be interrogated by the illuminating antennas that favors that location. This characteristic provides redundancy in reading the RFID tagged items.

The focusing function of FSS lens 930 provides a dual benefit. First, as mentioned above, it enhances the signal strength that is presented at RFID tagged items 950. In this way, the effective distance between RFID antennas 910 and RFID tagged items 950 is reduced, and thereby the reading reliability is improved. Second, the focusing function provides spatial selectivity. Each illuminating antenna (such as RFID antennas 910) provides a type of RF spotlight that broadly focuses an RF beam on a particular floor location. Based on the location of this RF beam, a host processor coupled to the RFID readers (such as processor 402 of FIG. 4) can determine the general floor location of each of RFID tag being read.

The spatial selectivity provided by system 900 alleviates a so called dense reader problem. The dense reader problem arises in a multi-RFID reader environments. In such environments, the potential for inter-modulation distortion, cross-modulation, and receiver desensitization goes up by approximately the square of the number of RFID readers in the environment. In system 900, the individual RF beams formed by FSS lens 930 each favor a relatively small floor area, as if an antenna of much higher directivity was in use without incurring the increased PFD that a truly higher gain antenna would cause. As a result, the response from adjacent floor areas is restricted. This characteristic limits the signal strength received by an RFID reader from all other RFID readers that are near by, as well as attenuating signals from an adjacent reader. This characteristic will alleviate the so called dense reader problem, where the presence of many readers within the same environment can cause multiple strong signals to be received by a particular reader, which in turn can cause receiver overload, intermodulation distortion, and the miss reading of tags.

The increased PFD provided by system 900 does not violate Federal Communications Commission (FCC) requirements. The FCC requires that the gain of a frequency hopping RFID reader having an output power of one watt shall not exceed 6.0 dBi when sensed with a linear polarized antenna. The intent of this FCC requirement is to provide a radiated power limit, such that the PFD, or effective isotropic radiated power (EIRP), does not exceed 4 watts when assessed at 3 meters. The FCC rationale is to negate the possible overloading of, or interference to, other pieces of wireless equipment that share the same frequency region.

In an embodiment, each RFID antenna 910 has a gain of 6.0 dB and uses a one watt transmitter in accordance with this FCC requirement. To illustrate that these specifications do not violate the intention of the FCC requirement, it will be assumed, for example, that FSS lens 930 is located approximately 15 feet (approximately 4.6 meters) above the floor and approximately 15 feet (approximately 4.6 meters) below RFID antennas 910. It is to be appreciated that this example is presented for illustrative purposes only, and not limitation. Other dimensions and distances may be utilized without deviating from the spirit and scope of the present invention, as would be apparent to a person skilled in the relevant art(s).

In this example, the PFD that is generated by RFID antennas 910 decreases with distance in accordance with the well-known inverse square law, and remains within the FCC requirement at 3 meters (approximately 10 feet). When the diminished signal reaches FSS lens 930 (approximately 15 feet or 4.6 meters from RFID antennas 910), FSS lens 930 provides a phase front modification that creates a converging action. At the proper focal distance below the lens, the signal re-converges (at the floor level, for instance) to provide a PFD amplitude that would have occurred if the distance from RFID antennas 910 had been approximately 10 feet (approximately 3 meters), minus some losses. The specified maximum PFD is not violated at any place along the approximately 30 foot path. By way of it's collimating action, FSS lens 930 transforms the divergent signal in such a way that RFID antennas 910 behave as if they were located approximately 10 feet from RFID tagged items 950, instead of 30 feet. In other words, the effective distance between RFID antennas 910 and RFID tagged items 950 is reduced, as mentioned above.

Although system 900 was described as being located in an airport baggage claim area, it is to be appreciated that system 900 may be implemented in other areas without deviating from the spirit and scope of the present invention. For example, system 900 may be implemented in other areas in which it is desirable to reduce the effective distance between an RFID antenna and an RFID tag, provide spatial selectivity of RFID tag reads, and/or mitigate against the dense reader problem. Such other areas may include, but are not limited to, a warehouse, a retail store, a supermarket, a train station, or some other area as would be apparent to a person skilled in the relevant art(s).

E. Tough Radome

In accordance with an embodiment of the present invention, the FSS technique is used to provide a tough radome for an RFID reader.

Many RFID reader antennas are located in environments that are physically abusive. A first example is an RFID antenna located on the front surfaces of a fork lift truck. Such an antenna can be damaged by objects that strike the front of the fork lift. A second example is an RFID antenna located at U.S. borders. A vehicle passing through a U.S. border may have a protrusion that can strike the RFID antenna and damage it. In a conventional RFID system, an RFID antenna is covered with a radome made from fiber glass or a plastic-like material. Such a material is chosen because it is moderately strong, weather proof, and RF transparent. Although a metal radome would be physically stronger than a fiber glass or plastic radome, metal radomes are typically not used because they are not RF transparent.

In accordance with an embodiment of the present invention, however, a FSS metal radome is provided that is physically strong and RF transparent. For example, FIG. 10 depicts a system 1000 that includes a metal radome 1010 that covers an RFID antenna 1020 (not specifically illustrated). FSS elements included on metal radome 1010 cause it to be RF transparent. If desired, the slots that are cut in the metallic radome to create the RF transparency can be filled with a strong dielectric material, such as plastic or ceramic materials, so as to allow the radome to be weather proof.

In a further embodiment, FSS elements included in metal radome 1010 are configured to modify RF signals sent and received by RFID antenna 1020, and thereby enhance the performance of RFID antenna 1020. Based on the design of metal radome 1010 (e.g., the placement, orientation and type of FSS elements), metal radome 1010 may be used to enhance the performance of RFID antenna in one or more of the following ways: (1) to improve the gain or the directivity pattern of RFID antenna 1020; (2) to act as a band-pass filter to only allow selected frequencies to pass through to RFID antenna 1020; (3) to modify the polarization characteristics of the emitted wave from RFID antenna 1020; (4) to control the reception angles to which RFID antenna 1020 responds; (5) to control the grating lobes that might be present in the directivity pattern of RFID antenna 1020; (6) to act as a voltage standing wave ratio (VSWR) correction device; and/or (7) to perform other enhancements as would be apparent to a person skilled in the relevant art(s).

F. RF Reflective, Optically Transparent RFID Sheet Shield (RROTSS).

In the past, RF multipath conditions present within most warehouses allowed tag misreads to take place quite frequently. For example, an RFID reader located at a first dock bay (such as bay number three) could misread a tag transported through a second dock bay (such as bay number four). Such a misread causes a host computer system to falsely conclude that a particular package was placed on the wrong delivery truck.

An embodiment of the present invention uses a sheet of FSS material to overcome the misread problem outlined above. In this embodiment, complimentary FSS material—comprising conductive dipoles, tripoles, Jerusalem cross, anchor elements, loops, spirals, etc.—is constructed in a skeleton manner where the normal area of each arm of each RSS element is outlined with a thin conductive material (usually metal). An array of such skeleton FSS elements, which are supported by a transparent dielectric material (such as a sheet of plastic), is constructed in the form of a hanging sheet. For example, the hanging sheet may be suspended between the docking bays of a warehouse. In this way, an optically transparent RF shield is erected between the adjacent bays. Such an RF shield substantially lowers the probability that an RFID reader located at the first dock bay (such as bay number three) does not misread an RFID tag that is located on a package 12 feet away transported through the second dock bay (such as bay number four).

The presence of the plastic RF shield of this embodiment is harmless. For example, if a fork lift truck strikes the hanging plastic sheet, the sheet will harmlessly swing out of the way during the encounter, and will return to the former position when the fork lift truck passes by.

V. An Example Method

FIG. 11 depicts a flowchart illustrating an example method for interrogating an RFID tag in accordance with an embodiment of the present invention. The method illustrated in FIG. 11 may be implemented by a RFID system that includes an FSS, such as the systems depicted in FIG. 6, 7A, 8, 9A, 9B, 9C, or 10.

Referring to FIG. 11, in a step 1102, an RF signal is transmitted. The RF signal is configured to be received by an RFID tag. For example, the RF signal may be transmitted by reader 104 to RFID tag 102, as described above, for example, in reference to FIG. 1.

In a step 1104, an FSS interacts with the transmitted RF signal. In an embodiment, the FSS is substantially transparent to the RF signal and the RF signal is simply transmitted through the FSS. The transparency of the FSS may be dependent on, for example, the frequency, polarization, and/or angle of incidence of the RF signal. For example, the RF signal may be transmitted through first and second FSS panels 620a and 620b of shipping container 610, through slide plate 720 of conveyor belt system 700, through FSS patch 820 of box bailer 810, or through tough radome 1020 of system 1000, as respectively described above with reference to FIGS. 6, 7A, 8 and 10. In another embodiment, the FSS modifies the transmitted RF signal is a desired manner. In such an embodiment, the FSS may, for example, re-direct, focus, de-focus, modify a polarization of the transmitted RF signal, as described above with respect to the systems depicted in FIGS. 6, 7A, 8, 9A, 9B, 9C, and 10. After interacting with the FSS, the RF signal is received by the RFID tag.

VI. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A system for interrogating radio frequency identification (RFID) tags, comprising:
   a conveyor belt having a first surface and a second surface, wherein the first surface is configured to receive an item to which an RFID tag is affixed and the second surface is configured to slide on a metal slide plate; and
   an RFID reader antenna, coupled to an RFID reader, configured to transmit instructions embodied in a radio frequency (RF) signal to the RFID tag;
   wherein the metal slide plate is positioned between the RFID reader antenna and the RFID tag, and wherein the metal slide plate comprises a frequency selective surface that results in the metal slide plate being substantially transparent to the RF signal.

2. The system of claim 1, wherein a structure of the frequency selective surface comprises at least one of a dipole, a tripole, an end-loaded tripole, a cross pattern, a square spiral, and a loop.

3. The system of claim 2, wherein the structure of the frequency selective surface is filled with a dielectric material.

4. The system of claim 3, wherein the dielectric material is a plastic or a ceramic.

5. The system of claim 1 further comprising a plurality of RFID reader antennas that are dispersed laterally along the metal slide plate.

6. The system of claim 5, wherein the RFID reader performs a sequential antenna reading protocol.

7. The system of claim 1 further comprising a plurality of RFID reader antennas that are dispersed longitudinally along the metal slide plate.

8. The system of claim 7, wherein the RFID reader performs a sequential antenna reading protocol.

9. The system of claim 1, wherein the conveyor belt is disposed in a substantially inclined orientation.

10. The system of claim 1, wherein the conveyor belt is disposed in a substantially declined orientation.

11. The system of claim 1 further comprising a drum turn-around configured to rotate and cause the conveyor belt to move such that there is no relative motion between the drum turn-around and the conveyor belt.

12. The system of claim 1, wherein the system is implemented in an airport or a warehouse.

* * * * *